(12) United States Patent
Freudelsperger et al.

(10) Patent No.: US 6,971,833 B1
(45) Date of Patent: Dec. 6, 2005

(54) ORDER PICKING SYSTEM

(75) Inventors: Karl Freudelsperger, Hart bei Graz (AT); Manfred Preiss, Rosstal (DE)

(73) Assignee: Knapp Logistik Automation GmbH, Hart bei Graz (AT)

( * ) Notice: Subject to any disclaimer, the term of this patent is extended or adjusted under 35 U.S.C. 154(b) by 0 days.

(21) Appl. No.: 09/647,955

(22) PCT Filed: Apr. 1, 1999

(86) PCT No.: PCT/DE99/01055

§ 371 (c)(1),
(2), (4) Date: Oct. 5, 2000

(87) PCT Pub. No.: WO99/52796

PCT Pub. Date: Oct. 21, 1999

(30) Foreign Application Priority Data

Apr. 8, 1998 (DE) ................................ 198 15 883

(51) Int. Cl.[7] .............................................. B65G 1/04
(52) U.S. Cl. ..................... 414/276; 414/268; 414/798.6
(58) Field of Search ............................... 414/268, 272, 414/276, 798.6, 222.13

(56) References Cited

U.S. PATENT DOCUMENTS

| | | | |
|---|---|---|---|
| 3,750,804 A | * | 8/1973 | Lemelson .................... 414/276 |
| 4,251,177 A | * | 2/1981 | Neuhaeusser et al. ....... 414/276 |
| 4,501,528 A | * | 2/1985 | Knapp ......................... 414/273 |
| 6,059,508 A | * | 5/2000 | Wunscher et al. ........... 414/276 |
| 6,409,449 B1 | * | 6/2002 | Freudelsperger et al. ... 414/276 |

FOREIGN PATENT DOCUMENTS

| | | | |
|---|---|---|---|
| EP | 0 794 135 | * | 9/1997 |
| EP | 0 795 495 | * | 9/1997 |

OTHER PUBLICATIONS

Patent Abstracts of Japan, vol. 096, No. 009. Sep. 30, 1996. JP 08 113325A, May 7, 1996.*

* cited by examiner

*Primary Examiner*—Douglas Hess
(74) *Attorney, Agent, or Firm*—McGlew and Tuttle, P.C.

(57) ABSTRACT

The invention relates to an order picking system (1) with at least one automatic commissioning machine (2) having article racks (3) in which channels (4) for articles are positioned which are inclined in relation to the horizontal. Said channels comprise an article stop element and an article distributing device on their lower longitudinal ends and can be filled with new articles at their other, higher longitudinal ends on the rack loading side (B). The order picking system provided for in the invention is characterized in that a movable rack steering unit (5) has an article handling device (51) which is mobile in three dimensions and has an article stack retaining device (52) which can contain a vertical stack of articles and can be positioned vertically at each higher longitudinal end of an article channel (4) on the rack loading side (B). The article stack retaining device (52) comprises a lower or upper slide (53) for pushing out individual articles which can be displaced in the transverse direction of the stack.

12 Claims, 24 Drawing Sheets

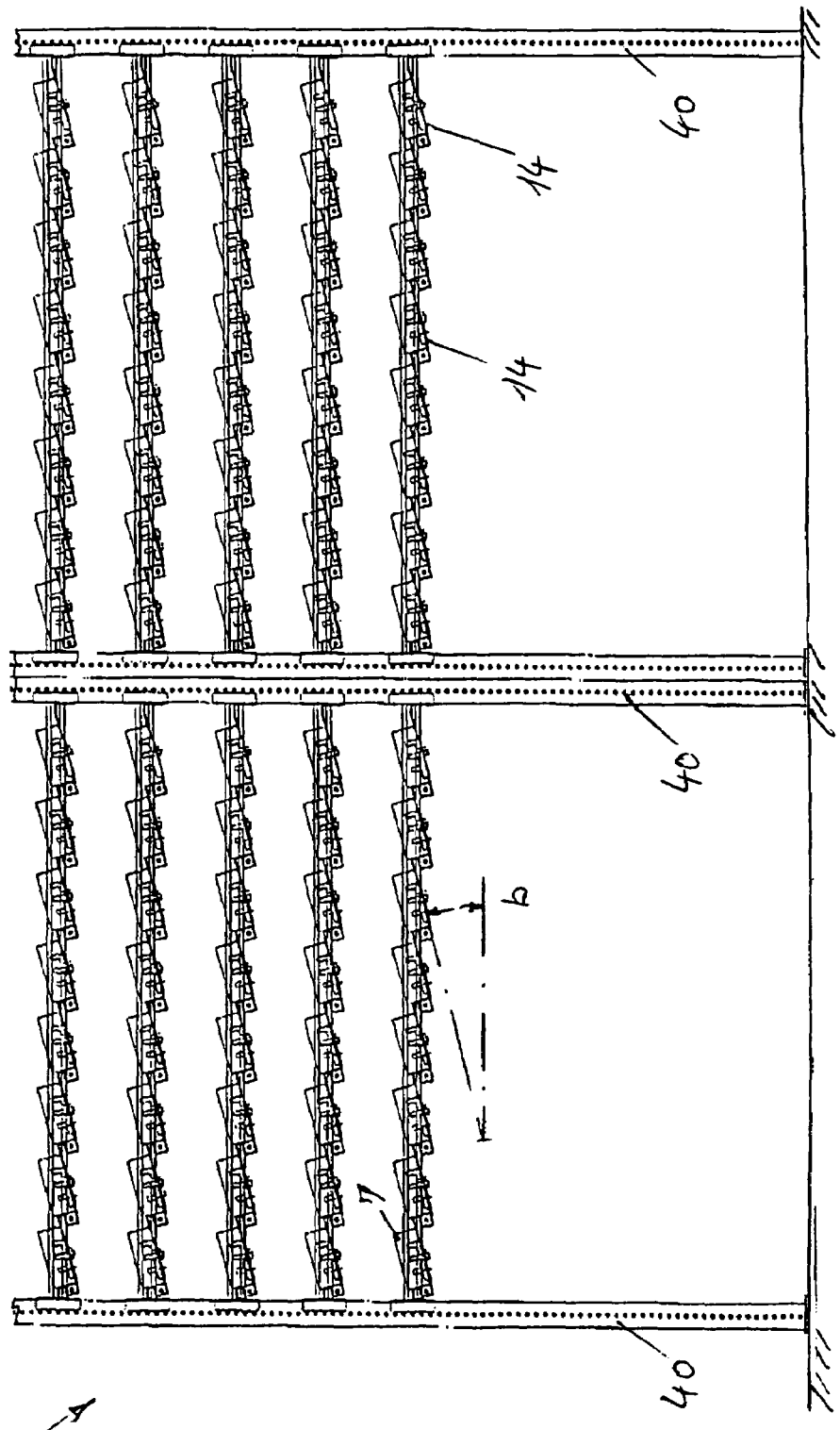

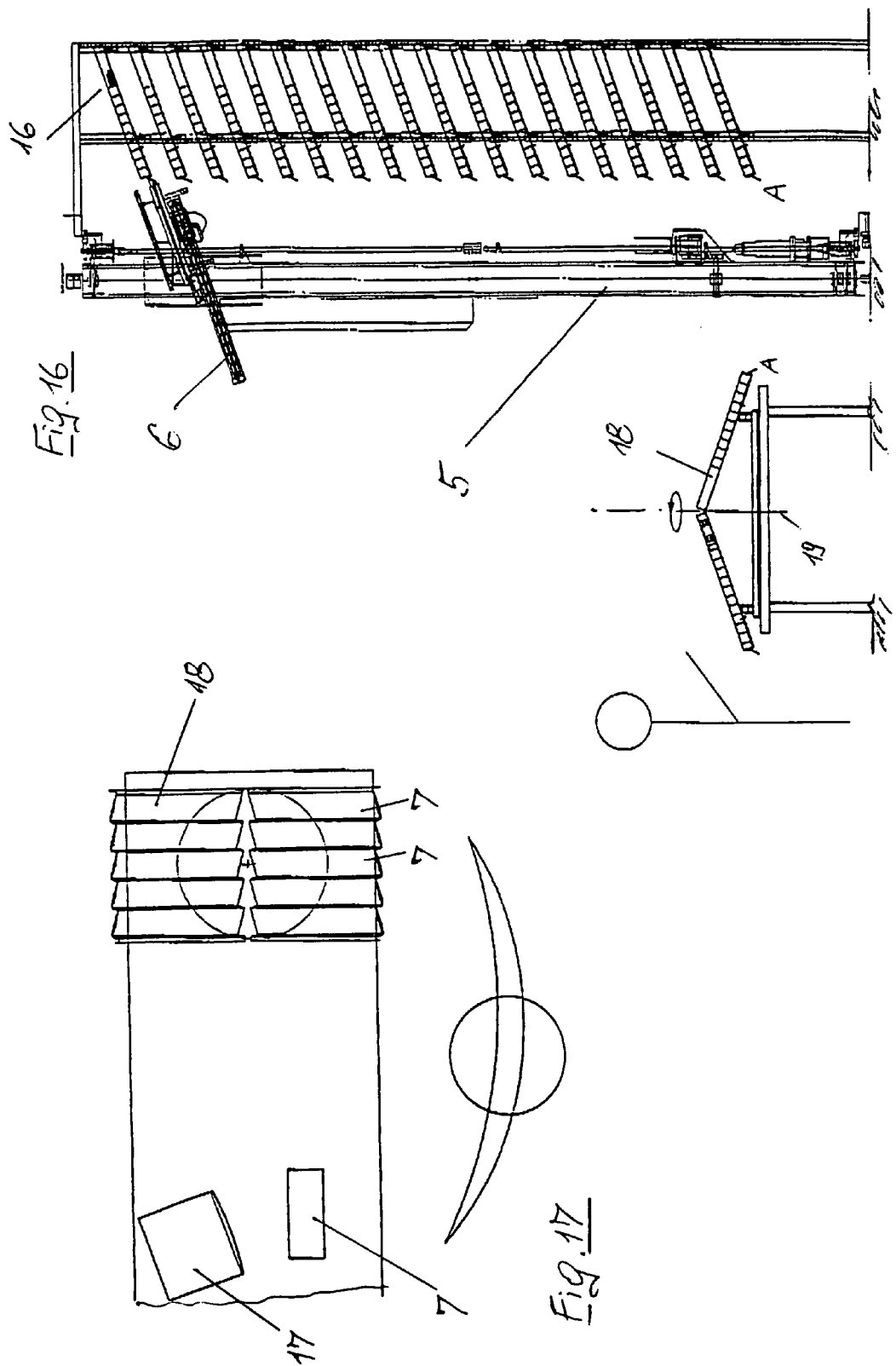

ORDER PICKING SYSTEM

FIELD OF THE INVENTION

The present invention pertains to a commissioning system with at least one automatic commissioning unit, which has at least one article bay with article shafts, which are arranged next to one another and one on top of another and are sloped against the horizontal, and in which articles to be commissioned can be stored, wherein each article shaft has means for stopping and dispensing the articles at one of its longitudinal ends, which end is located lower, and can be filled with new articles on the bay filling side at its other, higher longitudinal end. The present invention also pertains to a process for providing and storing articles in a commissioning unit, preferably one of the above-mentioned type.

BACKGROUND OF THE INVENTION

The filling shafts of automatic commissioning units have hitherto been loaded with new articles mainly manually. The operation is comparatively expensive and time-consuming.

According to EP 0 794 135, the filling is already partially automated and made more efficient for vertical or nearly vertical filling shafts accessible from the front. Not only an individual article, but already an entire stack of articles can be stored simultaneously in the filling shaft for each automatic unit. The stack of articles is handled in a special, box-like magazine with a longitudinal slot in one longitudinal side wall. The magazine serves the purpose of keeping the stack of articles consistently together, from the site of introduction at the acceptance department to the filling operation proper. The magazine is adapted to the shape of the articles and the plurality of stacked articles. After a filling operation in the automatic commissioning unit, the empty magazine is returned to the acceptance department for being filled again with articles.

SUMMARY AND OBJECTS OF THE INVENTION

The object of the present invention is to provide a commissioning unit of the type described in the introduction, which makes it possible by simple means to load articles into automatic commissioning units with so-called flow shelves and optionally also to expediently provide articles to be loaded.

According to the invention, a commissioning unit is provided with at least one automatic commissioning unit, which has article shafts. The article shafts are arranged next to one another and one on top of another and are sloped against the horizontal. The articles to be commissioned are stored in the unit, wherein each said article shaft has a means for stopping and dispensing articles at one of its longitudinal ends that is its lower end and can be filled with new articles at its other, higher longitudinal end on a bay filling side. A traveling bay-storage and retrieval unit is associated with the article bay and has an article-handling device that is movable in space with a stack-of-articles support. This can be positioned in an essentially vertical position with a correspondingly vertical stack of articles picked up in the support at each higher longitudinal end of a article shaft on the bay filling side. The stack-of-articles support has a lower individual article ejector, which is displaceable in the transverse direction of the stack and is preferably equipped with a counter, and by which the lowermost article of the stack of articles of the support can be pushed into the selected article shaft or, as an alternative, it has a stack-of-articles holding-up device, which can be pushed up and by which a topmost article of a pushed-up, obliquely positioned stack of articles reaches the selected article shaft under the force of gravity or by means of a upper individual article ejector, which is displaceable in the transverse direction of the stack and is preferably equipped with a counter.

The essence of the present invention is that a traveling bay-storage and retrieval unit associated with the article bay of the automatic commissioning unit has a magazineless article-handling device, which is movable in space, with a stack-of-articles support, which can be positioned in an essentially vertical position with a stack of articles which is picked up in the support and is correspondingly vertical at each higher longitudinal end of an article shaft on the bay filling side, wherein the stack-of-articles support has a lower individual article ejector, which is preferably equipped with a counter and can be displaced in the transverse direction of the stack, by which the lowermost article of the stack of articles of the support can be pushed into the selected article shaft, or, as an alternative, it has a stack-of-articles holding-up device, which can be pushed up and by which a topmost article of a pushed-up, obliquely positioned stack of articles enters the selected article shaft either under the force of gravity or by means of an upper individual article ejector, which can be displaced in the transverse direction of the stack and is preferably equipped with a counter.

A stack-of-articles support with a lower individual article ejector preferably has a vertically adjustable guide for a lowermost individual article to be pushed out.

The stack-of-articles support preferably has a pair of stack-of-articles clamping plates with a stack-of-articles pick-up and a transversely adjustable longitudinal stack-of-articles clamping plate with angle stop, by which a picked-up stack of articles can be elastically clamped in the transverse direction of the stack. To make possible a vertical movement, the stack of articles must be loosened for separation, where the longitudinal clamping plate preferably has spring-tensioned fingers such that no article can be caught on the spring-tensioned fingers in the loosened state, especially not by a longitudinally directed bar, which is in a parked position and is pushed forward.

The stack-of-articles support, which is held essentially vertically in each operating position, preferably has a doubly sloped angle sheet iron, wherein a stack of articles being held in the support is laterally fixed in the root of the angle by the force of gravity and the stack of articles is supported on the bottom side either on the individual article ejector or on the stack-of-articles holding-up device which can be pushed up.

For the efficient operation of the commissioning unit, provisions may be made for the article-handling device to have not only a stack-of-articles support for filling the automatic commissioning unit and optionally for removing and transporting a stack of articles from and into storage areas, but additionally also an article-handling unit, which is movable in space, for removing articles stack by stack and for transporting articles stack by stack from an acceptance department or from and to a supply bay, wherein the article-handling unit and the stack-of-articles support can be preferably aligned with one another and positioned in a vertical position and a stack of articles supported on the article-handling unit can be transferred into the stack-of-articles support by an adjustable transverse stack-of-articles pusher.

The article-handling unit of the bay-storage and retrieval unit, which is movable in space, comprises, in particular, a bottom-side stack-of-articles pick-up, an adjustable longitudinal stack-of-articles pusher, an adjustable transverse stack-of-articles pusher, and an adjustable longitudinal stack-of-articles clamping plate, which has, in particular, a row of spring-tensioned fingers and which presses a stack of articles picked up directly without a magazine in the clamped state against the stack-of-articles pick-up by the longitudinal stack-of-articles clamping plate, especially by the spring-tensioned fingers thereof.

Instead of the spring-tensioned fingers, it is also possible to provide other clamping means which ensure the local clamping of every individual article in the stack of articles, e.g., a flexible clamping strip having sufficient elasticity to reset.

The bay-storage and retrieval unit is preferably displaceable via a guide or rail system with or without switches from and to at least one supply bay and can be positioned at a selected lateral end of a shaft of the supply bay, especially an angle sheet iron, wherein an individual stack of articles to be handled is or can be arranged in each selected shaft and the stack of articles reaches an aligned article pick-up of the article handling unit by displacement in the direction of the stack, or, conversely, it reaches the selected shaft from the article pick-up.

In the case of small-sized products, it is optionally also possible to load two stacks of articles, which are now parallel, in a single shaft ("multiple load pick-up").

The supply bay may be a higher-level supply bay, which is associated with the automatic commissioning unit and is preferably located in the vicinity of the article bay of the automatic commissioning unit.

However, the supply bay may also be a buffer, which is associated with the acceptance department and is preferably located in the vicinity of the unpacking station, at which the stacks of articles are unpacked from a collective box and are put together.

Both one or more higher-level supply bays and one or more buffers are preferably present depending on the size of the commissioning unit and the local space conditions, and a plurality of automatic commissioning units may be present as well.

The commissioning unit according to the present invention can consequently be designed within broad limits as desired and, in particular, it can also be expanded in the future without difficulties.

The unpacked stacks of articles are expediently put together on a stack-of-articles stacker plate, which has the shape of a part of at least one bay level of the supply bay, and is formed especially by angle sheet irons, wherein the bay-storage and retrieval unit can also be displaced to the stack-of-articles stacker plate by displacement via the rail or guide system for taking over a stack of articles and it can be positioned at the stack-of-articles stacker plate, especially at a lateral end of an angle sheet iron.

For positioning at the bay-storage and retrieval unit, the stack-of-articles stacker plate may also be displaceable, especially on a conveyor belt or on a chute and/or be rotatable around a vertical axis preferably over an angle of 90° or 180°.

The stack-of-articles stacker plate may also be a vertically adjustable bay with drawers that can be pulled out, which can be operated manually or automatically.

A hand or foot switch may optionally be actuated by a human operator for adjusting the stack-of-articles stacker plate.

The commissioning unit may also be designed as a fully automatic unit such that an automatic unpacking unit with a gripping arm, which grasps a preferably horizontal stack of articles from an opened collective box and deposits it on the stack-of-articles stacker plate, is provided on the acceptance department side.

The opening and delivery of the collective box may optionally also be performed by means of a machine.

A supply bay of a particularly expedient design has one or more levels of angle sheet irons arranged next to one another, which levels are arranged one on top of another.

Each angle sheet iron may extend horizontally, but it is bent twice in a manner that is to be pointed out in particular, such that a chute is formed, which has a rectangular cross section and is oblique in the longitudinal direction, wherein the root of the angle is located at the lowest point in each cross section over the length of the chute and both surfaces of the legs of the angle are stop faces for a stack of articles picked up, and, furthermore, a detachable, preferably depressible article stop is provided at the deepest end of the chute.

The detachable article stop may be actuated not only remotely, but it may also be self-actuated, e.g., by a magnet. The article stop may also be rigid. In this case, the articles are lifted over with a suitable device during a displacement of a stack of articles.

In one variant of the present invention, the slope of the chute is about 20° in the longitudinal direction and the slope of the base of the chute is about 15° in the transverse direction. The more oblique the slope of the chute in the longitudinal direction, the greater is the independent slidability of the stack of articles in the chute. It was found that with the above-mentioned slope, a stack of articles is held in practical operation under stable conditions advantageously on the rear side and the top side with a rolling cart and it slides satisfactorily in the chute when a stack of articles is displaced in the system of the commissioning unit. The transverse slope of 15° always fixes a stack of articles in the angle root of the chute.

Consequently, a longitudinal fixing aid, which pushes the stack of articles against the article stop, may be provided in the chute.

The longitudinal fixing aid is expediently the rolling cart, a longitudinally adjustable, driven article stop or a spring-pretensioned article stop.

It shall be pointed out that different article sizes can be held in a fixed manner as a stack in the angle root in the above-mentioned chute sloping doubly at an angle. A cubic shape is sufficient. Thus, a single angle sheet iron may be used for different articles without the entire unit having to be converted.

The supply bay may also be a space-saving double bay, which is arranged back to back.

The article-handling unit of the bay-storage and retrieval unit expediently has a coupling pin, which can be caused to engage as a centering aid a corresponding recess in a selected shaft of a supply bay.

There are, however, basically a plurality of principles of positioning:

1) On the one hand, the repeating accuracy of the positioning of the bay-storage and retrieval unit can be utilized.
2) On the other hand, the fine positioning can be performed, as was mentioned above, mechanically by means of a coupling pin.
3) Finally, the fine positioning may be performed by means of sensors via a suitable sensory mechanism, in which case all the above-mentioned possibilities of combination are also conceivable.

The article-handling unit may also have a stop, especially a small roller, which can be caused to engage the stack-of-articles stop of a shaft for releasing or depressing the stack-of-articles stop, wherein the stop of the article-handling unit may also be the adjustable longitudinal pusher itself.

A commissioning unit that makes do without separate magazines for stacks of articles to be loaded in is characterized, in particular, by the stack-of-articles pick-up of the bay-storage and retrieval unit, the shaft and the angle sheet iron of the higher-level supply bay, the buffer and the stack-of-articles stacker plate at the acceptance department having the same design in terms of length, width and optionally slope (longitudinal slope, transverse slope).

However, the size of the angle sheet iron of the higher-level supply bay may also be different. The smallest possible number of classes are preferably determined in order to make it possible to load articles of different sizes as close as possible, while the stack-of-articles pick-up of the bay-storage and retrieval unit always remains the same (corresponding to the largest grid).

An especially expedient variant of a bay-storage and retrieval unit according to the present invention provides for the article-handling unit being fixed via a pivot axis on a carriage, which is transversely displaceable on a transverse rail with a slope in the depth of the shaft and in the longitudinal direction of the shaft of the supply bay, especially with a slope of about 20°, wherein the transverse rail is rigidly fastened to a vertically displaceable lifting carriage of the bay-storage and retrieval unit.

The transverse rail may also be designed as a telescope, such that it can be displaced in a stationary telescopic unit.

The special advantage of this variant is that a small number of axes are sufficient for positioning the article-handling unit (axis in parallel to the shaft including two electric cylinders for linkage). Likewise, only two pushers (longitudinal pusher and transverse pusher) are needed.

Another embodiment of the bay-storage and retrieval unit, which is no less expedient, is characterized in that the article-handling unit is a two-part unit and has a separate, vertically adjustable stack-of-articles pick-up unit with a plurality of angle sheet irons of the type, position and size of the stack-of-articles pick-up and of the supply bay, which has at least one adjustable second longitudinal stack-of-articles pusher of its own, wherein a plurality of stacks of articles can be delivered as well as loaded and unloaded by the stack-of-articles pick-up unit from the buffer or from the stack-of-articles pick-up to the higher-level supply bay, and it has a separate, vertically adjustable article bay loading unit, which is in turn a two-part unit and has a vertically adjustable individual stack-of-articles pick-up with the longitudinal stack-of-articles pusher and a transverse stack-of-articles pusher, on the one hand, and, on the other hand, a gripping unit or article support movable in space with the bottom-side stack-of-articles pick-up, with the longitudinal stack-of-articles clamping plate with angle stop and vertically adjustable sensor for a lowermost article to be pushed out, as well as with the individual article ejector, wherein a single selected stack of articles can be delivered by the article bay loading unit from the supply bay (higher-level supply bay, buffer) or from the stack-of-articles stacker plate of the acceptance department into the automatic commissioning unit, and each article can be loaded there individually into a selected oblique article shaft of the automatic commissioning unit by the article support.

It is also conceivable, in principle, to intermediately store a plurality of stacks of articles from the supply bay at the bay-storage and retrieval unit and to load them in the automatic commissioning unit one after another.

To load the stack of articles into the automatic commissioning unit, the stack of articles can be expediently removed by the individual stack-of-articles pick-up from the supply bay in the longitudinal direction of the stack by displacement with the longitudinal stack-of-articles pusher and can be delivered to the automatic commissioning unit and after transfer and transverse displacement of the stack of articles from the individual stack-of-articles pick-up by the transverse stack-of-articles pusher to the bottom-side stack-of-articles pick-up of the aligned gripping unit (or by direct takeover by the gripping unit) and after clamping of the entire stack of articles in the transverse direction of the stack by the longitudinal clamping plate with the spring-tensioned fingers, it can be positioned and individually loaded at the selected shaft of the automatic commissioning unit by moving the gripping unit.

The gripping unit is preferably fastened via an axis of rotation to a vertically adjustable lifting carriage, which is in turn vertically displaceable on a vertical bar of the bay-storage and retrieval unit, which bar is articulated on the bottom side around two axes that are at right angles to one another.

The vertical bar expediently has a shorter length than the vertical bar on which the single stack-of-articles pick-up and the stack-of-articles pick-up unit are vertically displaceable. The reason for this is that the height of a higher-level supply bay may be approx. 5.5 m, while the height of the automatic commissioning unit is usually approx. 2.5 m (the height of a flow shelf, which is currently approx. 2.0 m, can be selected to be considerably higher in the future in the case of automatic refilling, possibly with the introduction of a second dispensing plane including a central conveyor belt located at a higher level).

The axis with a length of 2.5 m may also be part of the principal axis and be connected to same in the form of a tandem axis.

The special advantage of the second embodiment variant is that the automatic commissioning unit filling unit has a sufficiently long (approx. 2.5 m) axis, by which the displacement of the gripping unit along the shaft is facilitated. The vertical axis or bar proper of the bay-storage and retrieval unit carries only the pick-up unit (a plurality of stacks of articles on one side, a single stack of articles on the other side), which is likewise suitable for high supply bays (in the range of approx. 5.5 m).

A plurality of stacks of articles for buffering are also conceivable on the other side. The stack-of-articles pick-up unit may also be rotatable around a vertical axis by 180° in order to be able to service double-sided bays.

In the second embodiment variant, it may be advantageous to use two separate devices for introducing and loading goods, because the operations may have different priorities and it may thus be possible to make do with fewer devices.

It is advantageous in each of the above-mentioned two basic embodiment variants of the article-handling device for the direct loading into an oblique shaft of an automatic commissioning unit to be performed after the loosening of the clamping closure of the stack of articles by slightly setting back the longitudinal clamping plate while pushing out a lowermost or topmost individual article by means of the individual article ejector of the stack-of-articles support of the bay-storage and retrieval unit at the same time. The stack of articles to be loaded (which is positioned nearly or exactly in the vertical direction) is then held displaceably guided in the vertical direction in the stack-of-articles support, namely, by a vertically adjustable individual article push-out guide or a stack-of-articles holding-up device and/or, e.g., by an angle stop at the longitudinal clamping plate.

To hold the stack of articles displaceably in the vertical direction, it is also possible to provide a securing means in the form of a device that prevents an article from being caught in the longitudinal clamping plate with spring-tensioned fingers, e.g., a round bar, which can be displaced from a parked position into the area in front of the spring-tensioned fingers.

The present invention provides a process for making ready and loading articles in a commissioning unit, with at least one automatic commissioning unit, which has at least one article bay with article shafts, which are arranged next to one another and one on top of another and are sloped against the horizontal, in which articles to be commissioned can be stored, wherein each article shaft has a means for stopping and dispensing the articles at one of its longitudinal ends, which end is located lower, and can be filled with new articles at its other, higher longitudinal end on the bay filling side, and the process is characterized especially in that a traveling bay-storage and retrieval unit associated with the article bay with an article-handling device, which is movable in space, with a stack-of-articles support is positioned in an essentially vertical position of the support with a correspondingly vertical stack of articles picked up in the support at a selected, higher longitudinal end of an article shaft on the bay filling side, wherein the lowermost article of the stack of articles of the support is pushed into the selected article shaft by a lower individual article ejector, which is displaceable in the transverse direction of the stack, or, as an alternative, a topmost article of a pushed-up, obliquely positioned stack of articles is introduced by the force of gravity into the selected article shaft by a stack-of-articles holding-up device that can be pushed up or by an upper individual article ejector that is displaceable in the transverse direction of the stack.

Moreover, the bay-storage and retrieval unit may be used to transport complete stacks of articles from the acceptance department and/or from and to supply storage areas. However, the stacks of articles positioned at the automatic commissioning unit are fed into the automatic commissioning unit article by article, and, in an embodiment for feeding separate articles, the stack of articles can be first transferred from one device (article-handling unit) to another device (stack-of-articles support), but if the support/gripping unit and the (optionally displaceable) individual article ejector and the (optionally displaceable) stack-of-articles holding-up device or the (displaceable) guide for a lower individual article to be pushed out are designed correspondingly, a single device of the bay-storage and retrieval unit can also perform all the above-mentioned operations.

If, e.g., the individual article ejector is just not yet needed during a transport operation, it can, e.g., be pivoted away from the stack-of-articles support and, e.g., a (likewise displaceable) longitudinal stack-of-articles pusher may be arranged or operate in this area.

Thus, the present invention makes it possible to completely abandon separate stack-of-articles magazines (contrary to the state of the art mentioned in the introduction). Thus, such magazines do not need to be manufactured, nor do they need to be adapted to a special stack of articles, nor do they need to be conveyed within the system of the commissioning unit, and especially returned as empties from the automatic commissioning unit to the acceptance department, which is normally located at a great distance. The commissioning unit makes possible a favorable workplace design at the acceptance department. As the collective cardboard boxes with the articles (e.g., the amount of articles to be commissioned daily) are delivered there by a truck, the cardboard boxes can be unpacked there by a plurality of persons rapidly and effectively in a short time and simultaneously and the stacks of articles can be put together, e.g., in a morning shift. Nevertheless, the bay-storage and retrieval unit or bay-storage and retrieval units perform (normally over the entire workday) the distribution and the loading of the articles stack by stack at the necessary point in the automatic commissioning unit or at an optimized point within the system of the unit, utilizing supply bays in the form of a higher-level supply bay or supply bays and/or buffer(s), which can be complemented or rearranged almost at will for an expansion or modification of the commissioning unit.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 7 is a view of a stack-of-articles support with an upper individual article ejector during the filling of the article shaft similarly to FIG. 6;

FIG. 15 is a view of a part of the higher-level supply bay according to FIG. 9 viewed in a schematic side view from the bay aisle;

FIG. 16 is a schematic vertical view of an unpacking station with a buffer and a bay-storage and retrieval unit arranged in-between;

FIG. 17 is a schematic top view of an unpacking station according to FIG. 16;

DESCRIPTION OF THE PREFERRED EMBODIMENTS

Figure 1:
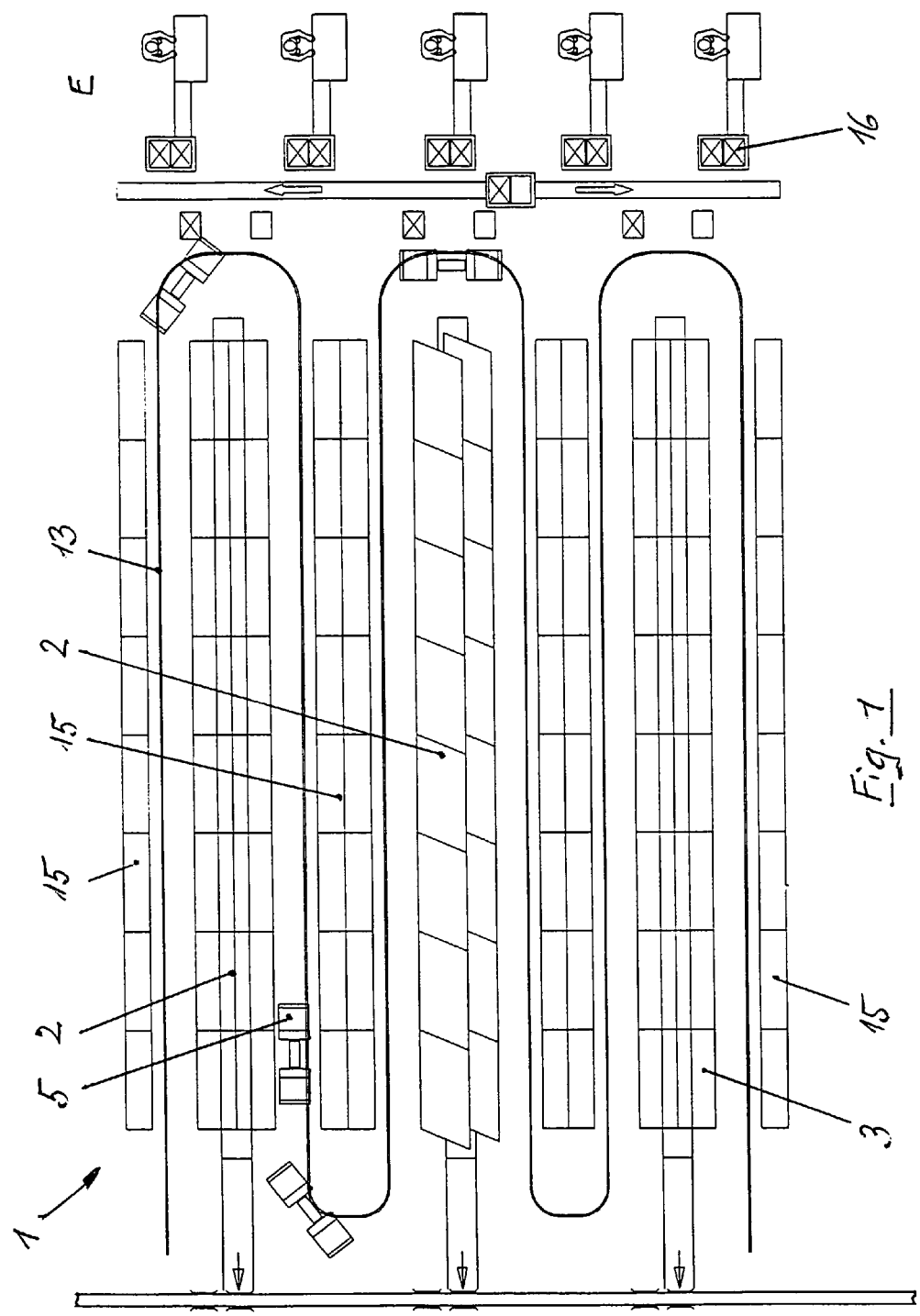
FIG. 1 is a schematic top view of a commissioning unit with automatic commissioning units, rail-borne bay-storage and retrieval units, higher-level supply bays, buffers and unpacking station.

Referring to the drawings in particular, FIG. 1 schematically shows a top view of a commissioning unit 1 with three automatic commissioning units 2, four higher-level supply bays 15 and five workplaces at the acceptance department E with stack-of-articles stacker plates and buffers 16, wherein four bay-storage and retrieval units 5 are displaceable between the individual areas via a guide or rail system 13.

Figure 2:
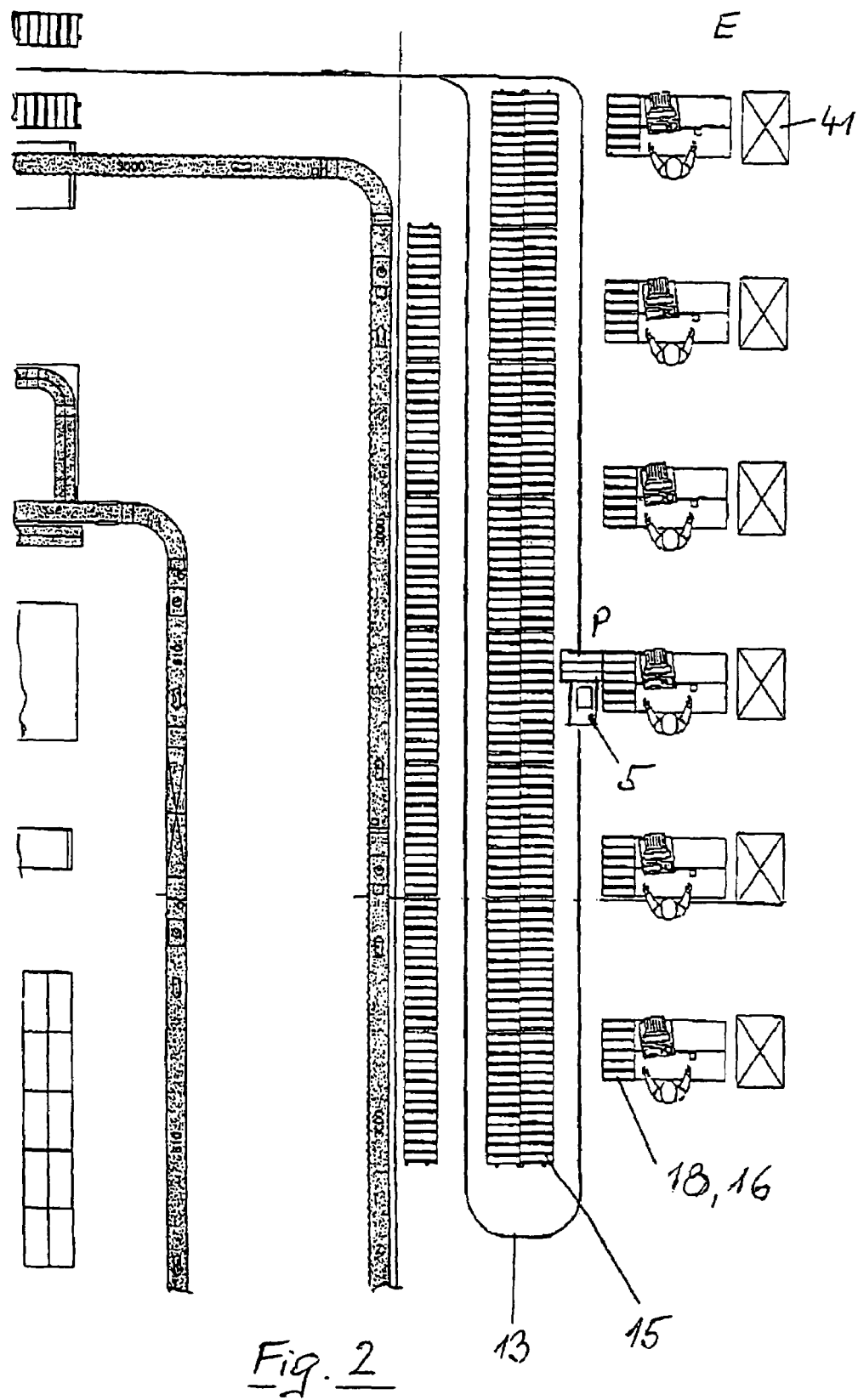
FIG. 2 is a schematic top view similar to FIG. 1 of a commissioning unit in the area of the unpacking station.

Another variant of the system is shown with respect to the acceptance department E in FIG. 2.

Each automatic commissioning unit 2 has a plurality of article bays 3 with article shafts 4, which are arranged next to one another and one on top of another and are sloped against the horizontal, in which articles to be commissioned can be stored, wherein each article shaft 4 has a means for stopping and dispensing the articles at one of its longitudinal ends, which end is located lower, and can be filled with new articles at its other, higher longitudinal end on the bay filling side B.

The bay-storage and retrieval units 5, e.g., according to the two basic variants according to FIGS. 3 through 8, on the one hand, and according to FIGS. 9 through 14, on the other hand, have an article-handling device 51 that is movable in space with a stack-of-articles support 52, which can be positioned in an essentially vertical position with a correspondingly vertical stack of articles taken up in the support at each higher longitudinal end of an article shaft 4 on the bay filling side B of an automatic commissioning unit 2 due to the repeating accuracy of the bay-storage and retrieval unit, due to a suitable mechanical fine centering, due to a sensory aid of the fine centering or due to a combination of the above-mentioned three principles of positioning.

In individual variants, the stack-of-articles support 52 has a lower (or upper) individual article ejector 53, which is displaceable in the transverse direction of the stack and by which the lowermost (or topmost) article of the stack of articles 7 of the support can be pushed into the selected article shaft 4.

If the individual article ejector 53 is arranged at the top, the stack of articles 7 is always pressed upward against the ejector 53 by a stack-of-articles holding-up device 54, which is arranged at the bottom and can be pushed up, and the stack of articles is "held up." After an individual article has been pushed up, the stack-of-articles holding-up device always pushes up the stack of articles by the height of the article, and the article height may differ from one article to the next.

Figure 8:
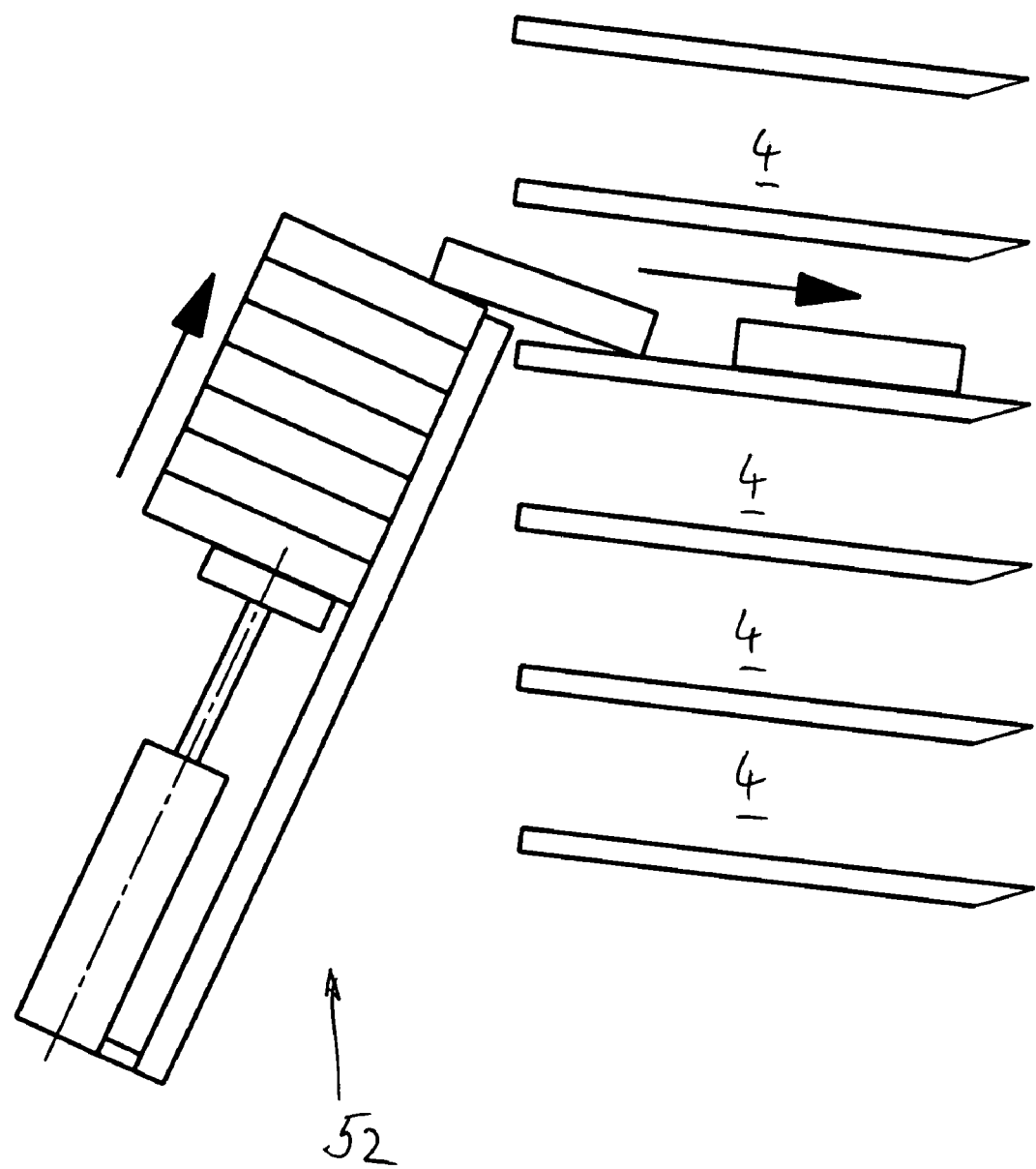
FIG. 8 is a view of a stack-of-articles support with upper, automatic article shaft filling and stack-of-articles holding-up device that can be pushed up.
Figure 9:
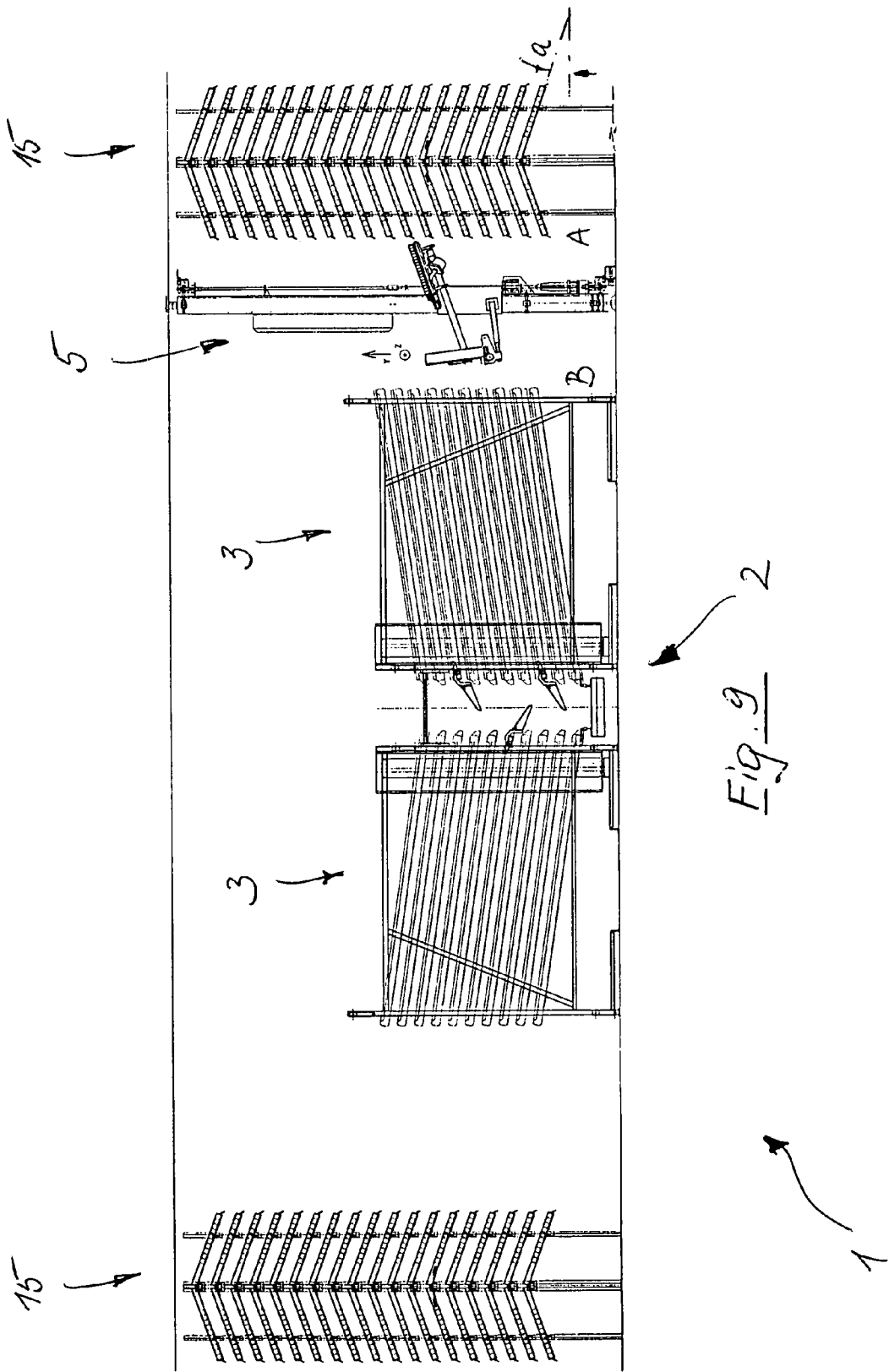
FIG. 9 is a schematic front view of two commissioning units and higher-level supply bays according to FIG. 1 with another bay-storage and retrieval unit in a bay aisle.

The upper individual article ejector may be eliminated in the latter embodiment variant when—if the stack of articles is in a corresponding oblique position according to FIG. 8—a pushed-up stack of articles pushes the topmost article upward from the stack-of-articles support 52 and this topmost article automatically enters the selected article shaft 4 by the force of gravity.

In the case of a stack-of-articles support 52 with a lower individual article ejector 53, a vertically adjustable guide 55 is preferably also provided for a lower individual article to be pushed out. Similarly to an above-mentioned stack-of-articles holding-up device, the above-mentioned guide must also be set to the corresponding article height.

The stack-of-articles support 52 may have a pair of stack-of-articles clamping plates with a stack-of-articles pick-up 8 and a transversely adjustable longitudinal stack-of-articles clamping plate 12, which elastically clamps a picked-up stack of articles 7 in the transverse direction Q of the stack, e.g., during the travel of the bay-storage and retrieval unit.

The stack-of-articles support 52, which is held essentially vertically in each operating position, may have a doubly sloped angle sheet iron 14, wherein a stack of articles 7 picked up in the support is laterally fixed in the root of the angle by the force of gravity and the stack of articles is supported on the bottom side either on the individual article ejector 53 or on the stack-of-articles holding-up device 54 that can be pushed up.

Figure 10:
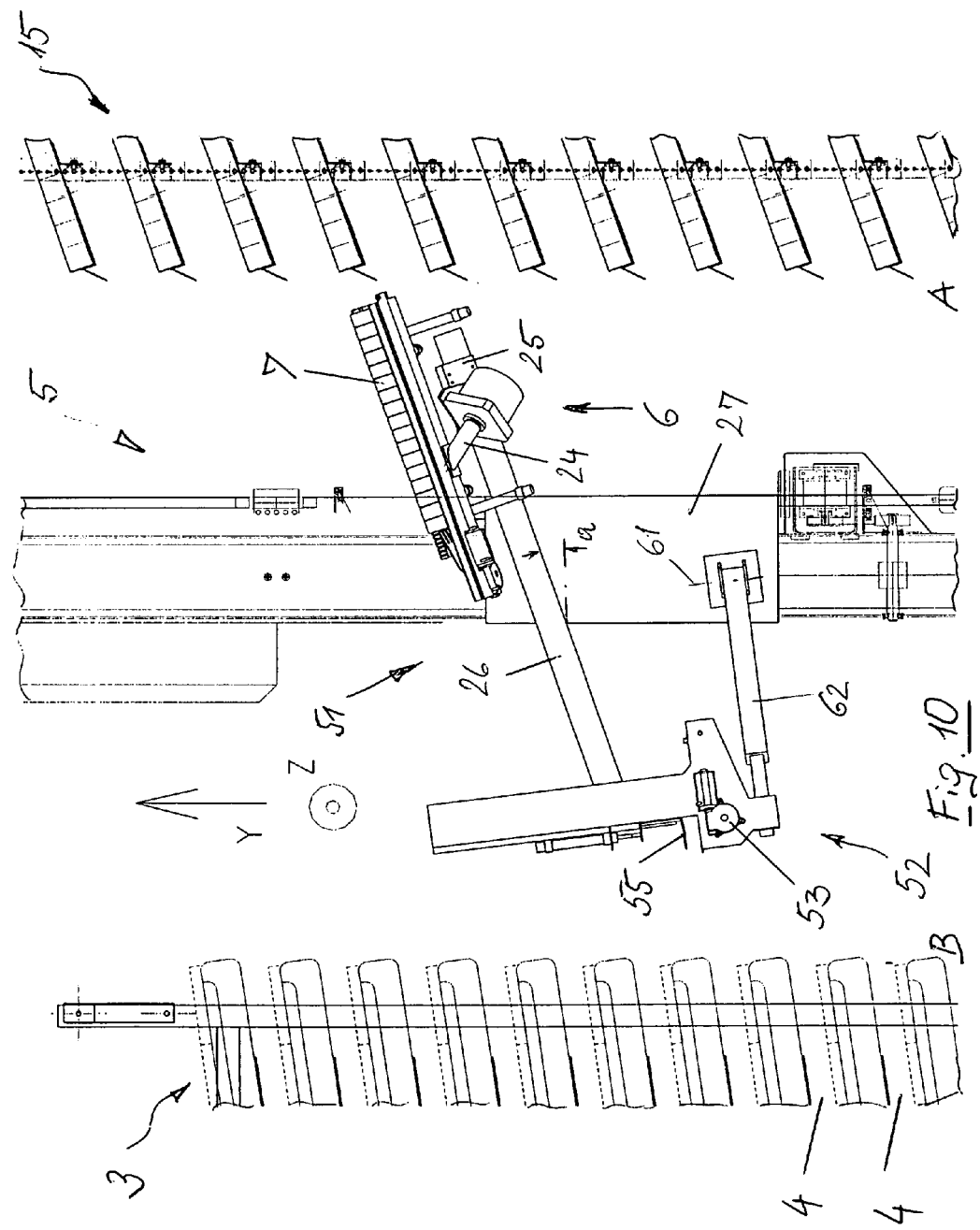
FIG. 10 is a view of the bay-storage and retrieval unit according to FIG. 9 with a stack-of-articles support that is movable in space and an article-handling unit that is movable in space immediately after the displacement of a stack of articles in the direction of the stack from a higher-level supply bay onto the article-handling unit.
Figure 11:
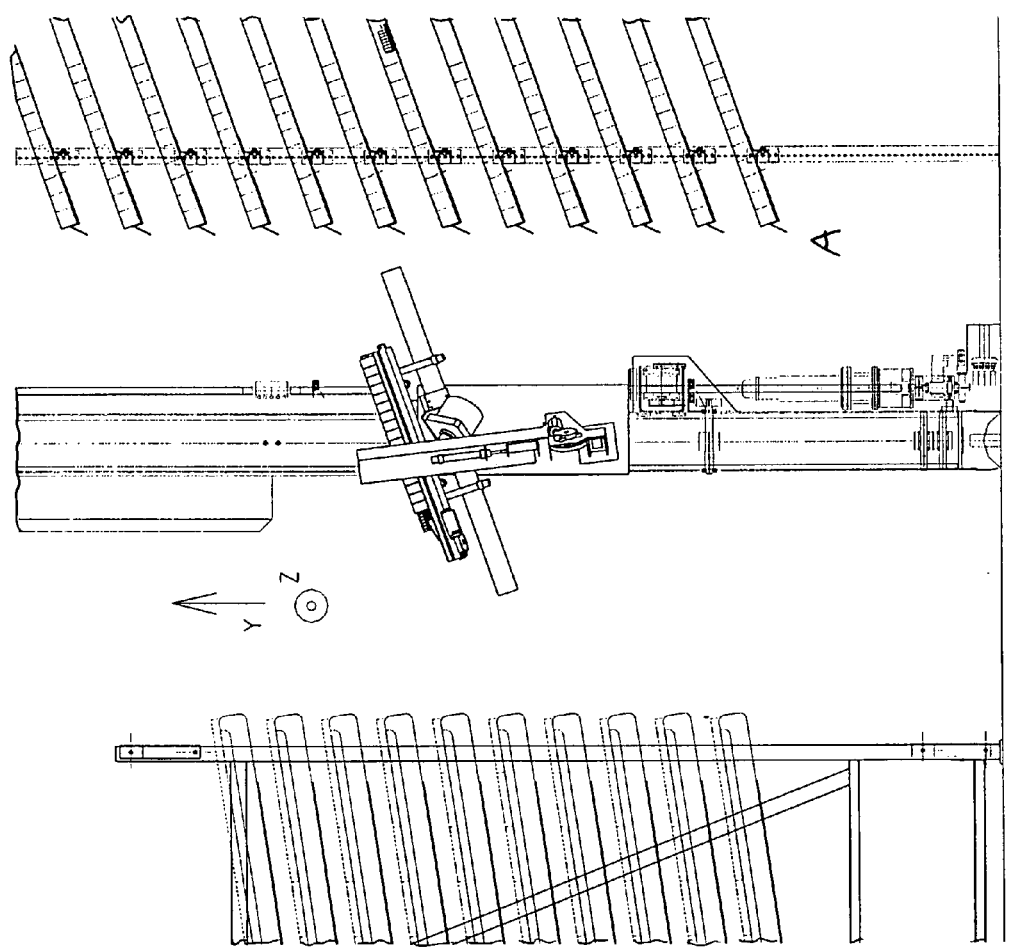
FIG. 11 is a view of the bay-storage and retrieval unit according to FIGS. 9 and 10 in a middle position of the essentially vertical stack-of-articles support and the oblique article-handling unit with the stack of articles picked up for transporting the stack of articles in the bay aisle.
Figure 12:
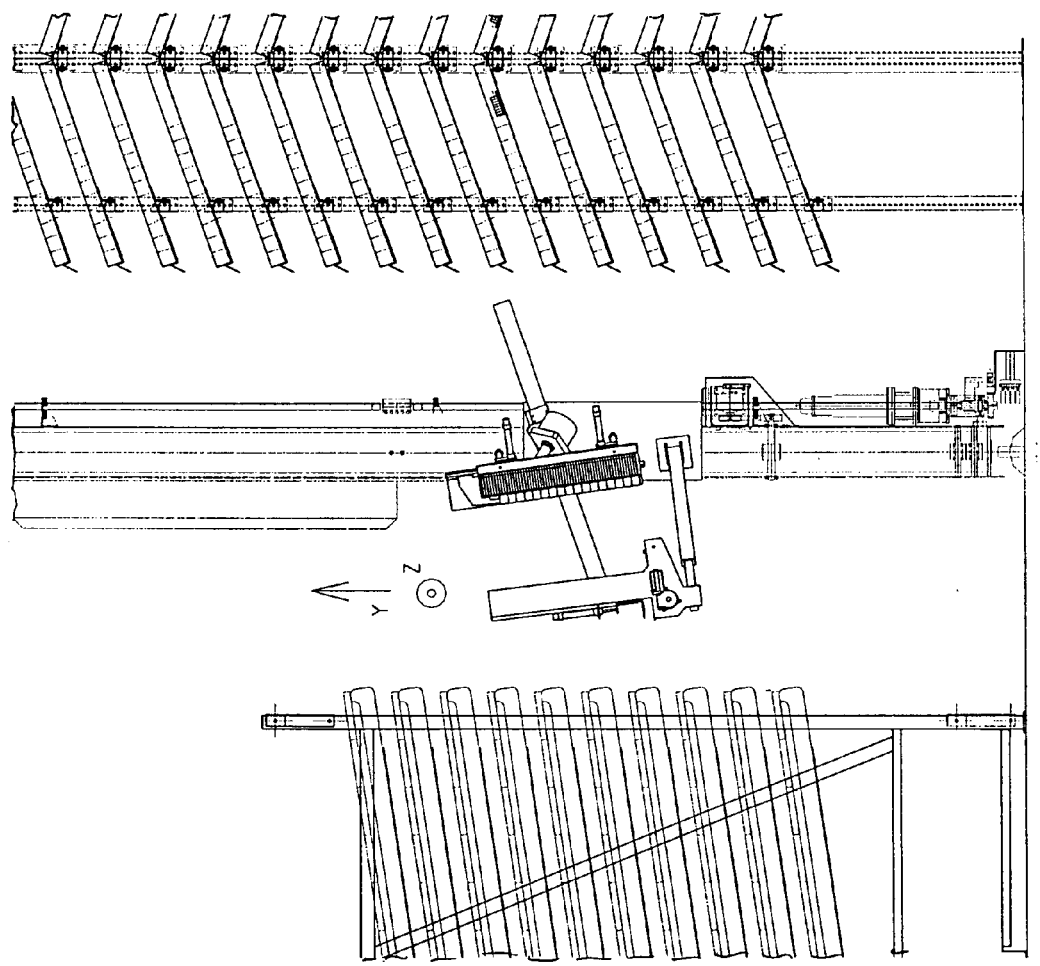
FIG. 12 is a view of the bay-storage and retrieval unit according to FIG. 11 after the transport of the stack of articles immediately before the transfer of the essentially vertical, especially slightly oblique stack of articles with parallel arrangement of the stack-of-articles support and the article-handling unit.

The article-handling device 51 may have not only a stack-of-articles support 52 for filling the automatic commissioning unit 2 and optionally for removing and transporting a stack of articles from and to storage areas, but additionally also an article-handling unit 6 that is movable in space for the removal of articles stack by stack and for transporting articles stack by stack from an acceptance department E or from and to a supply bay, wherein the article-handling unit 6 according to FIG. 10 and the stack-of-articles support 52 can be preferably aligned with one another in a vertical position and positioned and a stack of articles 7 picked up on the article-handling unit 6 can be transferred into the stack-of-articles support 52 by an adjustable transverse stack-of-articles pusher 10.

Figure 13:
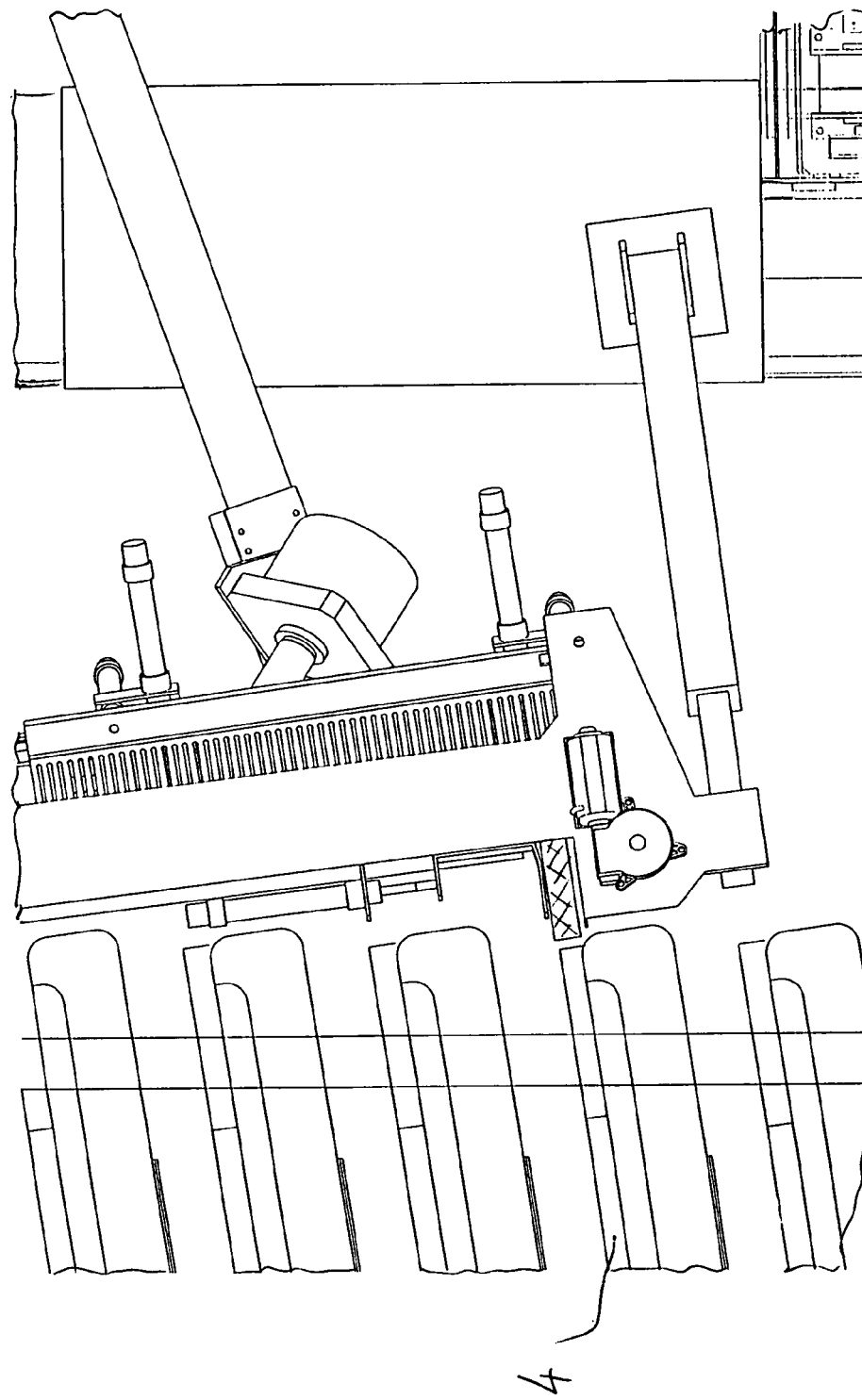
FIG. 13 is a view of the transfer of a lowermost article of the stack of articles held in the stack-of-articles support into an article shaft of the automatic commissioning unit with a lower individual article push-out guide and a lower individual article ejector.
Figure 14:
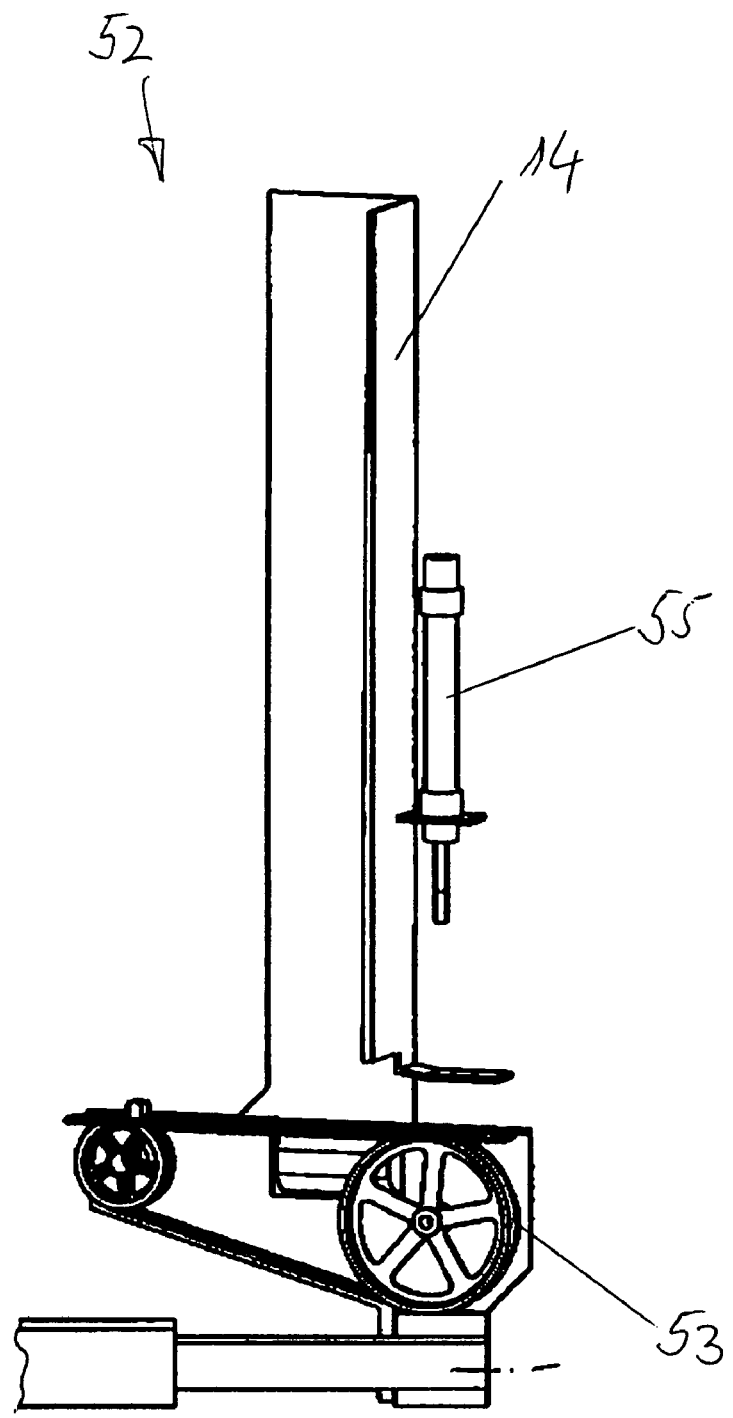
FIG. 14 is a view of a stack-of-articles support with angle sheet iron for laterally supporting a picked-up stack of articles.
Figure 18:
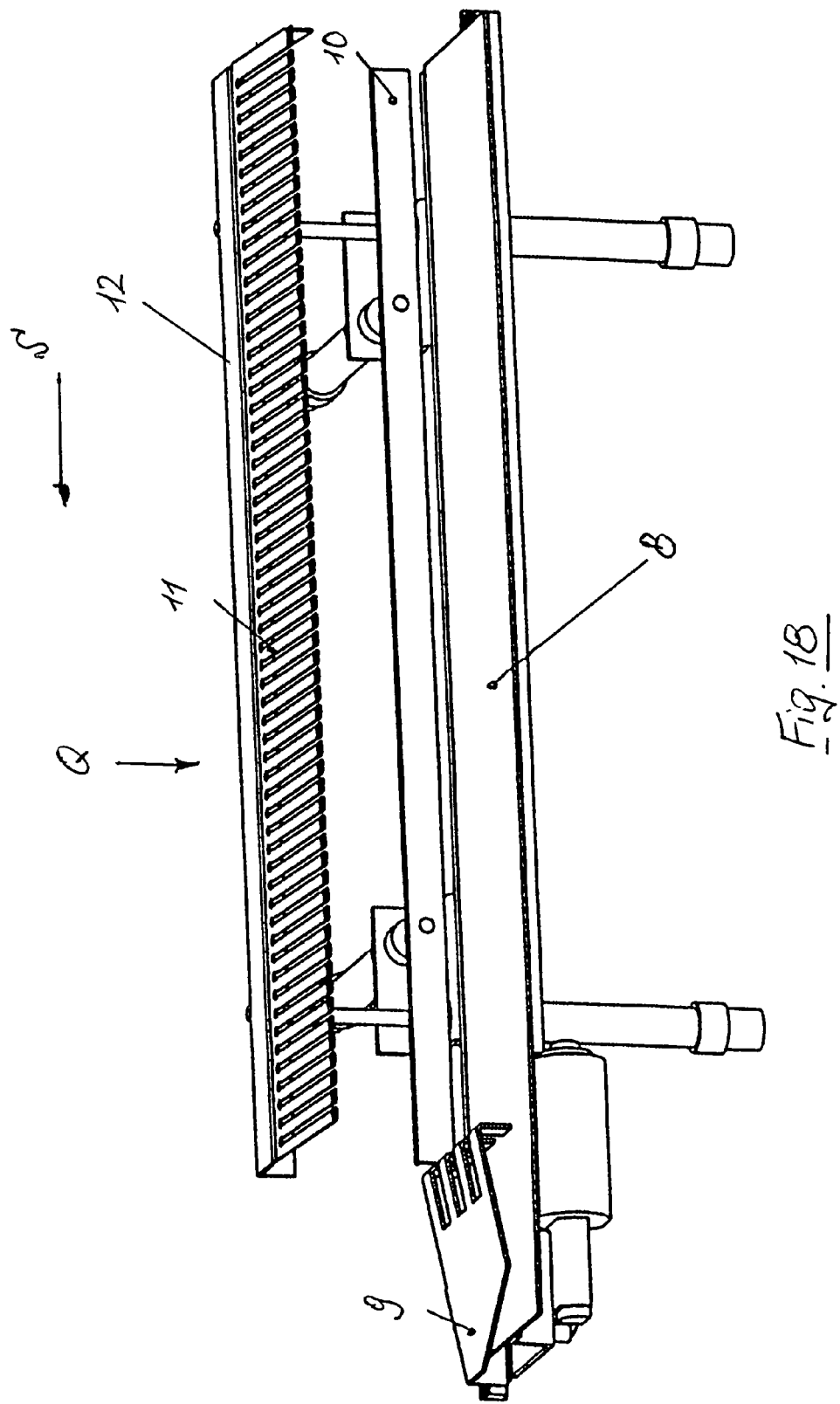
FIG. 18 is a perspective view of the article-handling unit according to FIGS. 9 through 13 in the area of their stack-of-articles pick-up.

The article-handling unit 6 according to FIG. 10 can also enter the stack-of-articles support 52, while the spring-tensioned pressing plate is released there and the stack of articles is vertically displaceable, but the article-handling unit 6 remains in the position of the stack-of-articles support 52 as is shown in FIG. 13.

Figure 3:
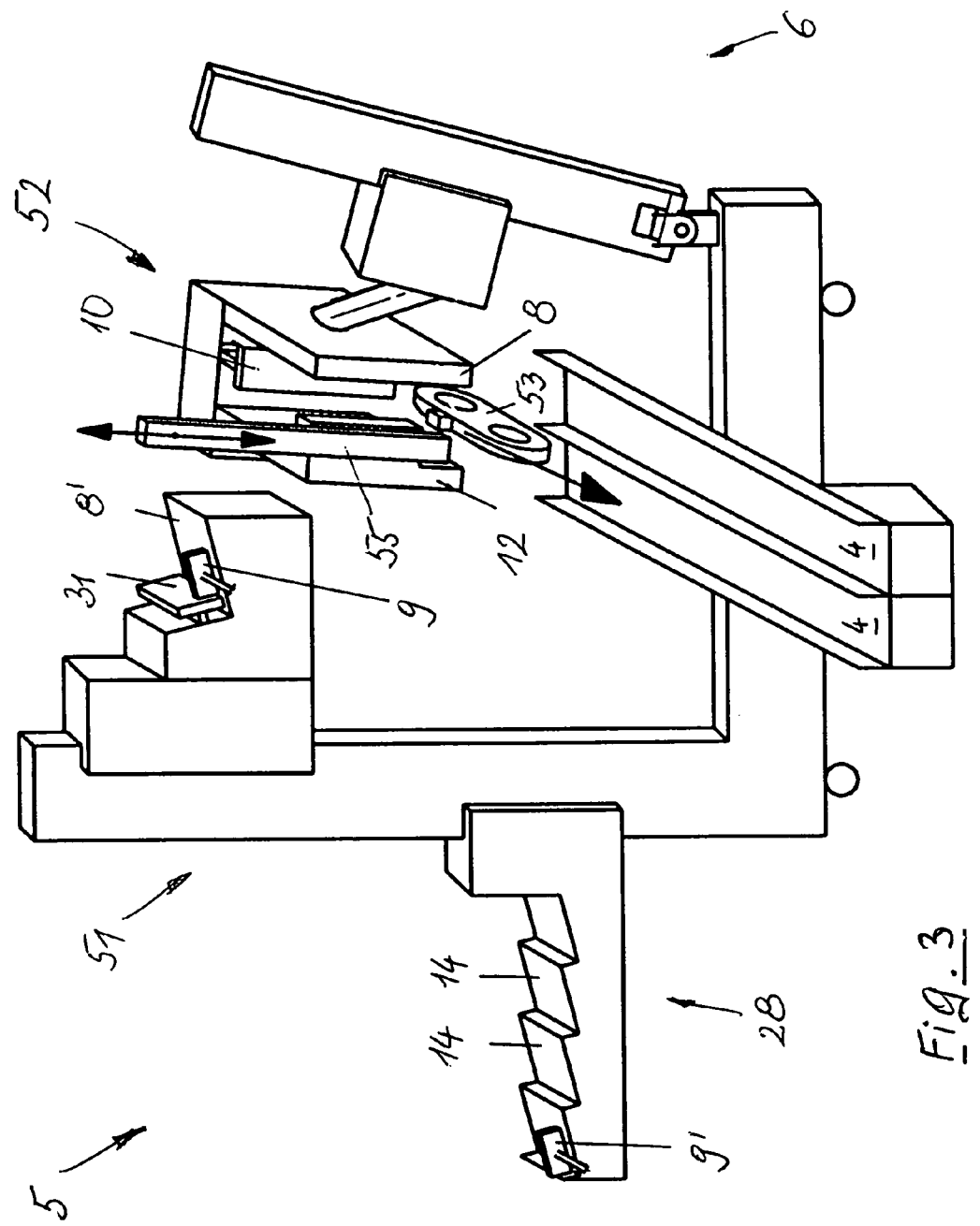
FIG. 3 is a schematic perspective view of a first embodiment variant of a bay-storage and retrieval unit according to FIG. 1 with a stack-of-articles support in a filling position of the automatic commissioning unit.
Figure 4:
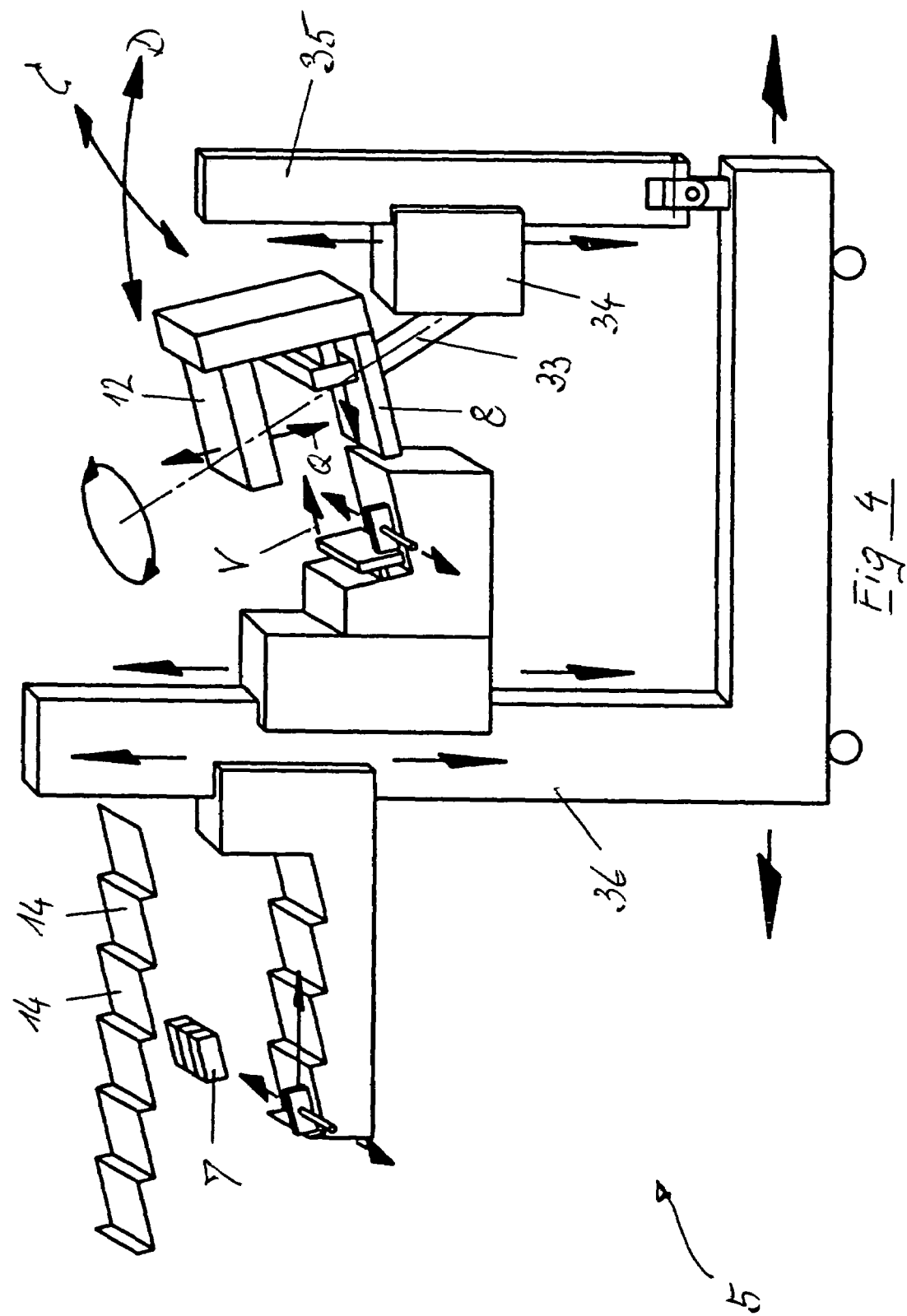
FIG. 4 is a view of the bay-storage and retrieval unit according to FIG. 3 with a stack-of-articles support in a stack-of-articles-displacing position.
Figure 5:
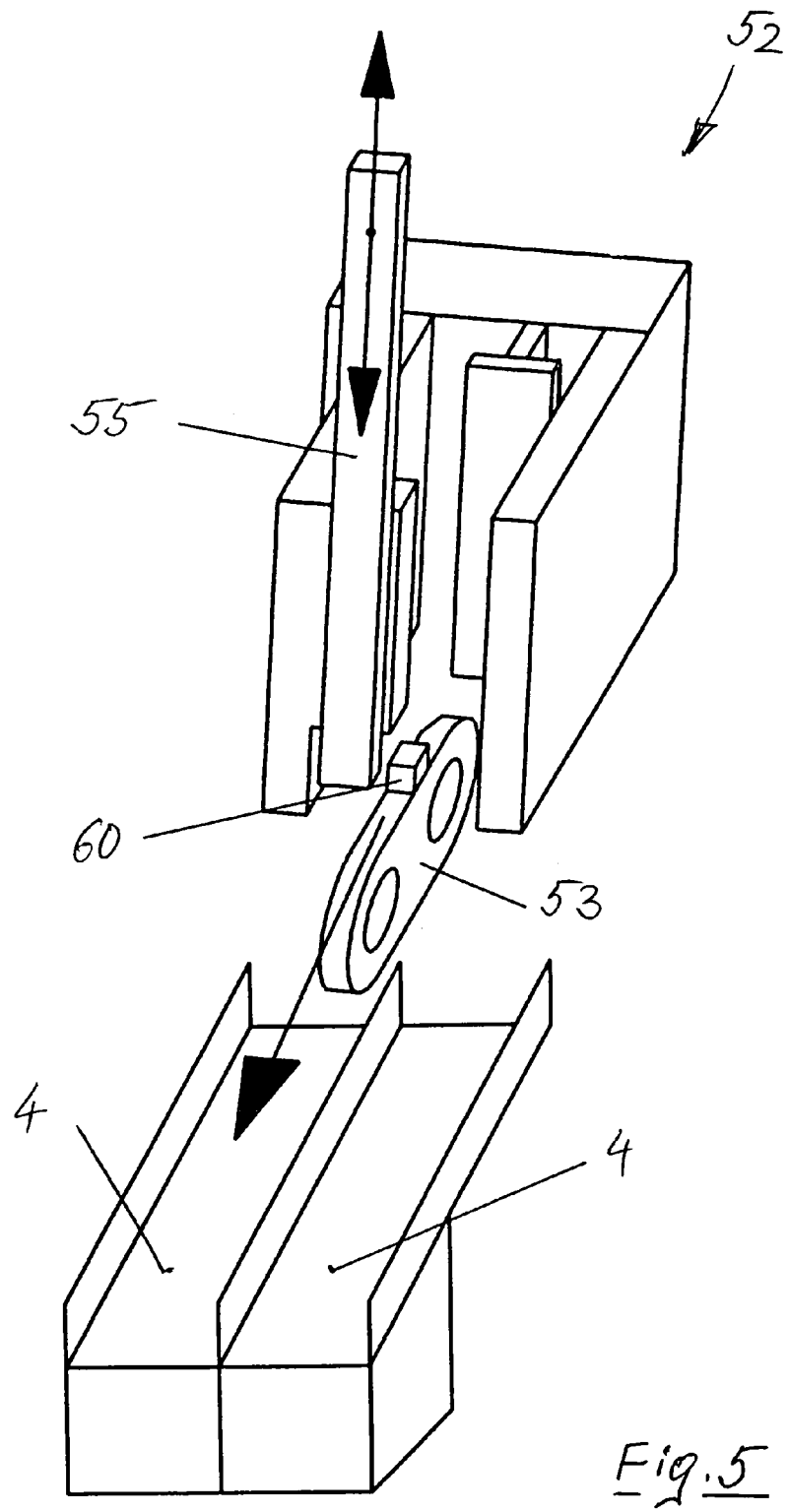
FIG. 5 is a view of the stack-of-articles support according to FIG. 3 with two oblique article shafts of an automatic commissioning unit.
Figure 6:
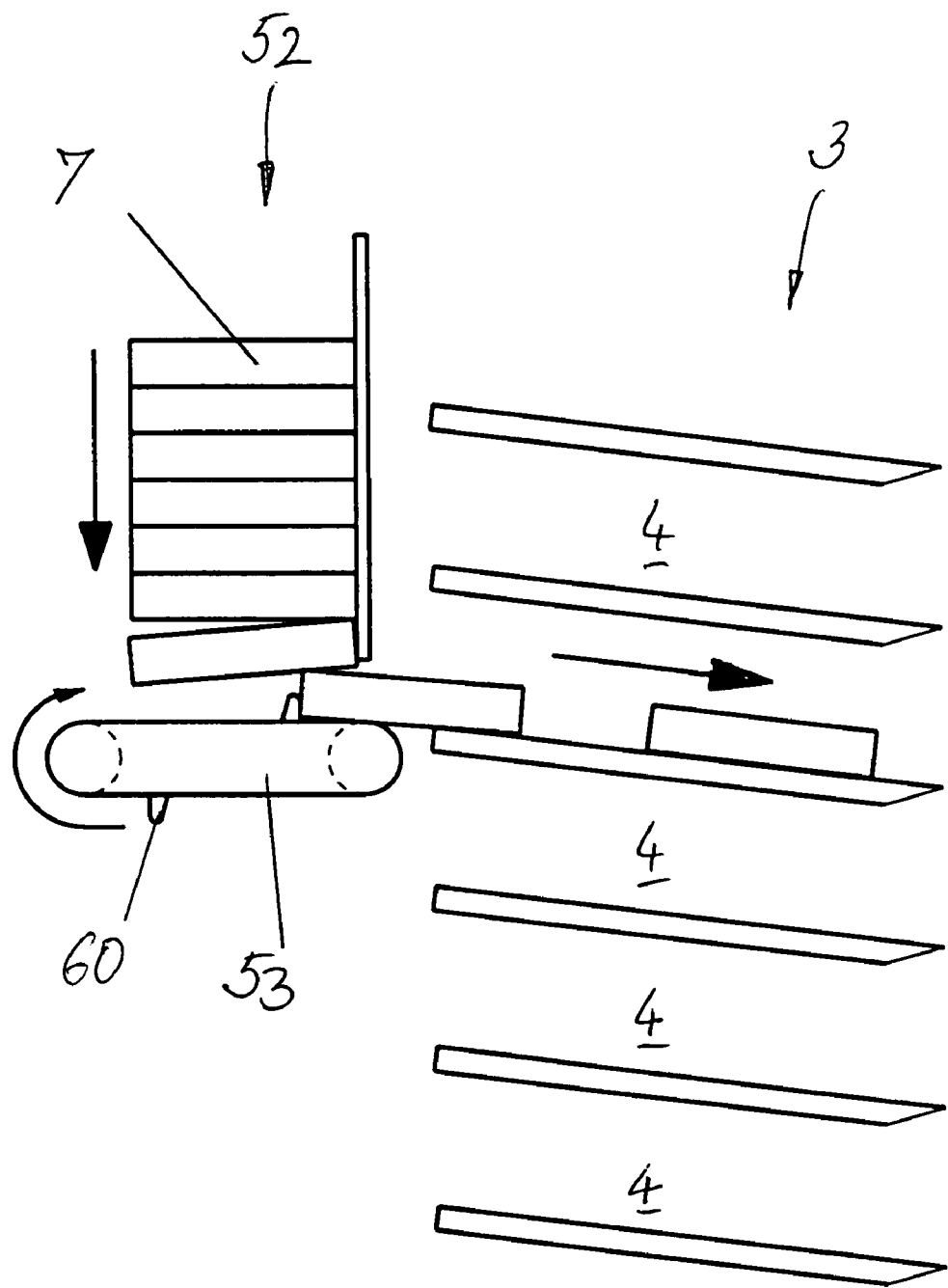
FIG. 6 is a schematic side view of a stack-of-articles support with a lower individual article ejector during the filling of the article shaft.
Figure 2:
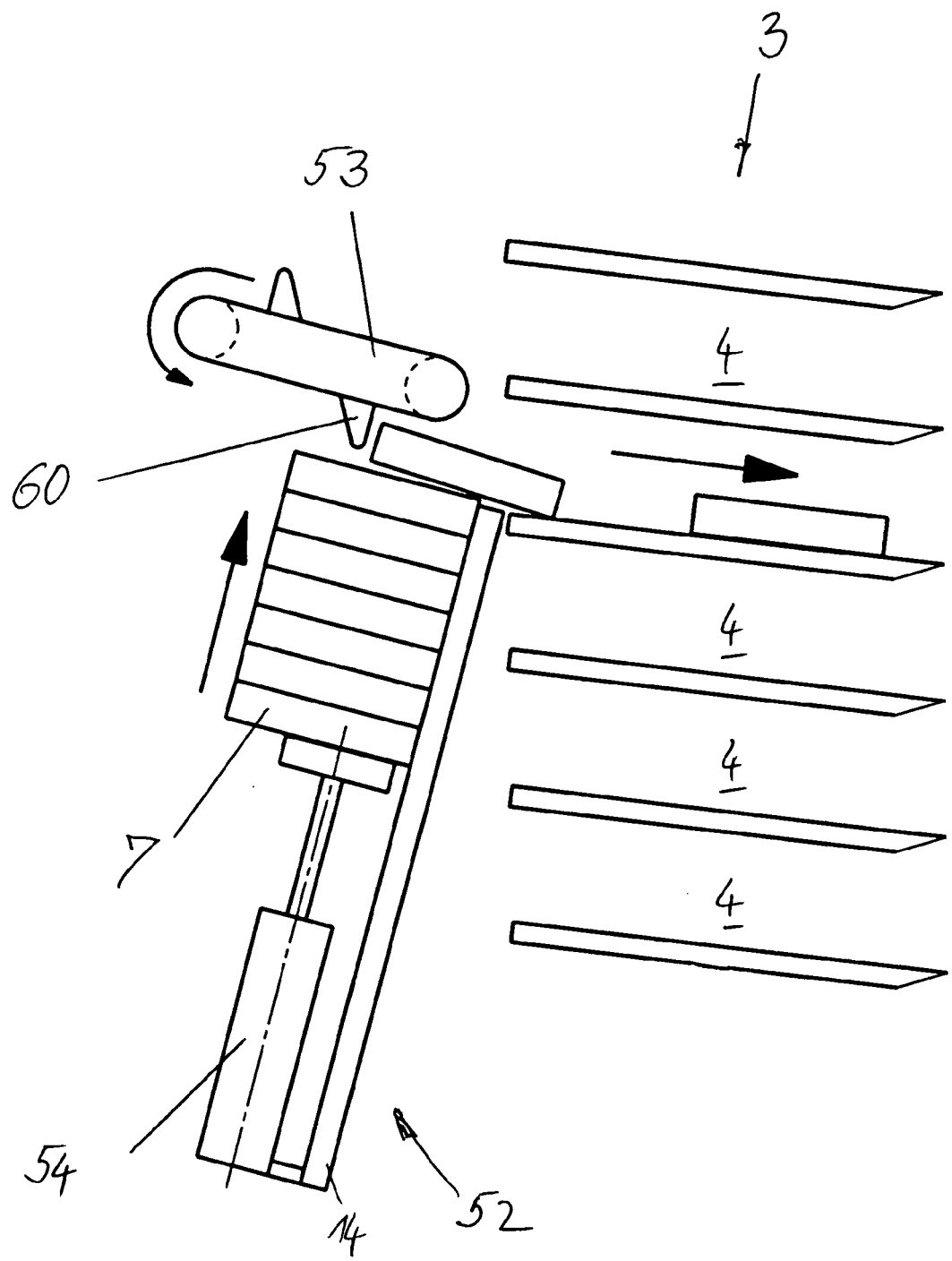

As is shown especially in FIG. 3, the article-handling unit 6 of the bay-storage and retrieval unit 5 that is movable in space may have a "bottom-side" stack-of-articles support 8, an adjustable longitudinal stack-of-articles pusher 9, an adjustable transverse stack-of-articles pusher 10 and an adjustable longitudinal stack-of-articles clamping plate 12, which has especially a row of spring-tensioned fingers 11 and is located in parallel to and opposite the stack-of-articles pick-up 8 and pushes a stack of articles 7 picked up directly against the stack-of-articles support by the longitudinal stack-of-articles clamping plate, especially by its spring-tensioned finger 11, in the transverse direction Q of the stack in the clamped state.

Each supply bay, both the higher-level supply bay 15 and the buffer 16, has the same basic design in the form of a stand 40 with four supports and a plurality of bay planes in the form of doubly sloped angle sheet irons 14 arranged next to one another, as is shown especially in FIGS. 15 and 16.

The stack-of-articles stacker plate 18 at the acceptance department E also has a corresponding design, but it is located in a single bay level only, and two stacker plates 18 may be arranged back to back, as is apparent especially from FIGS. 16 and 17.

Figure 20:
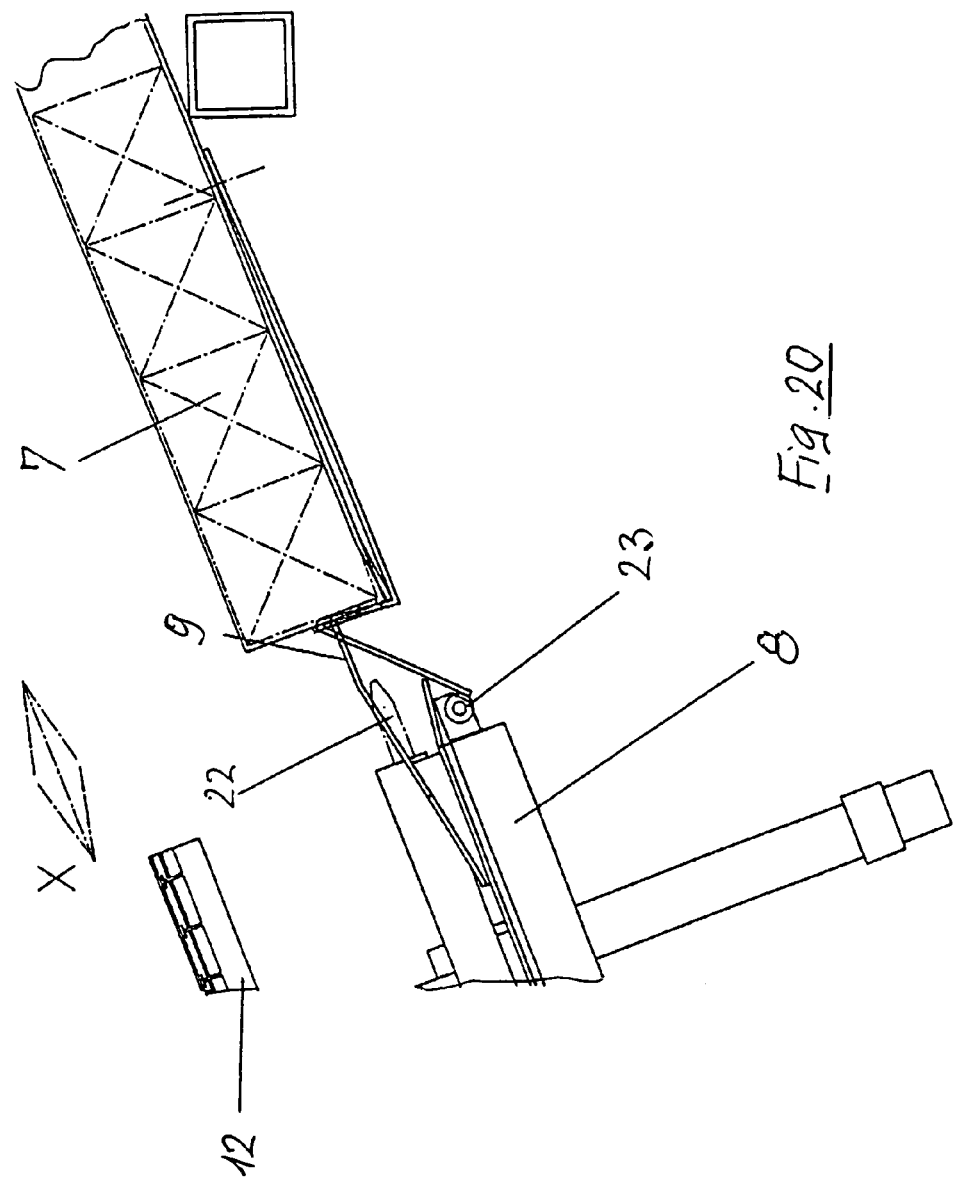
FIG. 20 is a schematic view showing a vertical partial section of the docking operation of the article-handling unit according to FIG. 9 at a higher-level supply bay in another position during the operation.

A doubly sloped angle sheet iron 14 forms a chute, which is rectangular in its cross section and oblique in its longitudinal direction, wherein the root of the angle is located at the lowermost point in each cross section over the length of the chute and both surfaces of the legs of the angle are stop faces for a stack of articles 7 picked up, and, furthermore, a detachable, preferably depressible article stop 20 is provided at the lowermost end of the chute, as is shown especially in FIG. 20.

The slope a of the chute in the longitudinal direction is 19°. The slope b of the base of the chute in the transverse direction is 15°.

Figure 19:
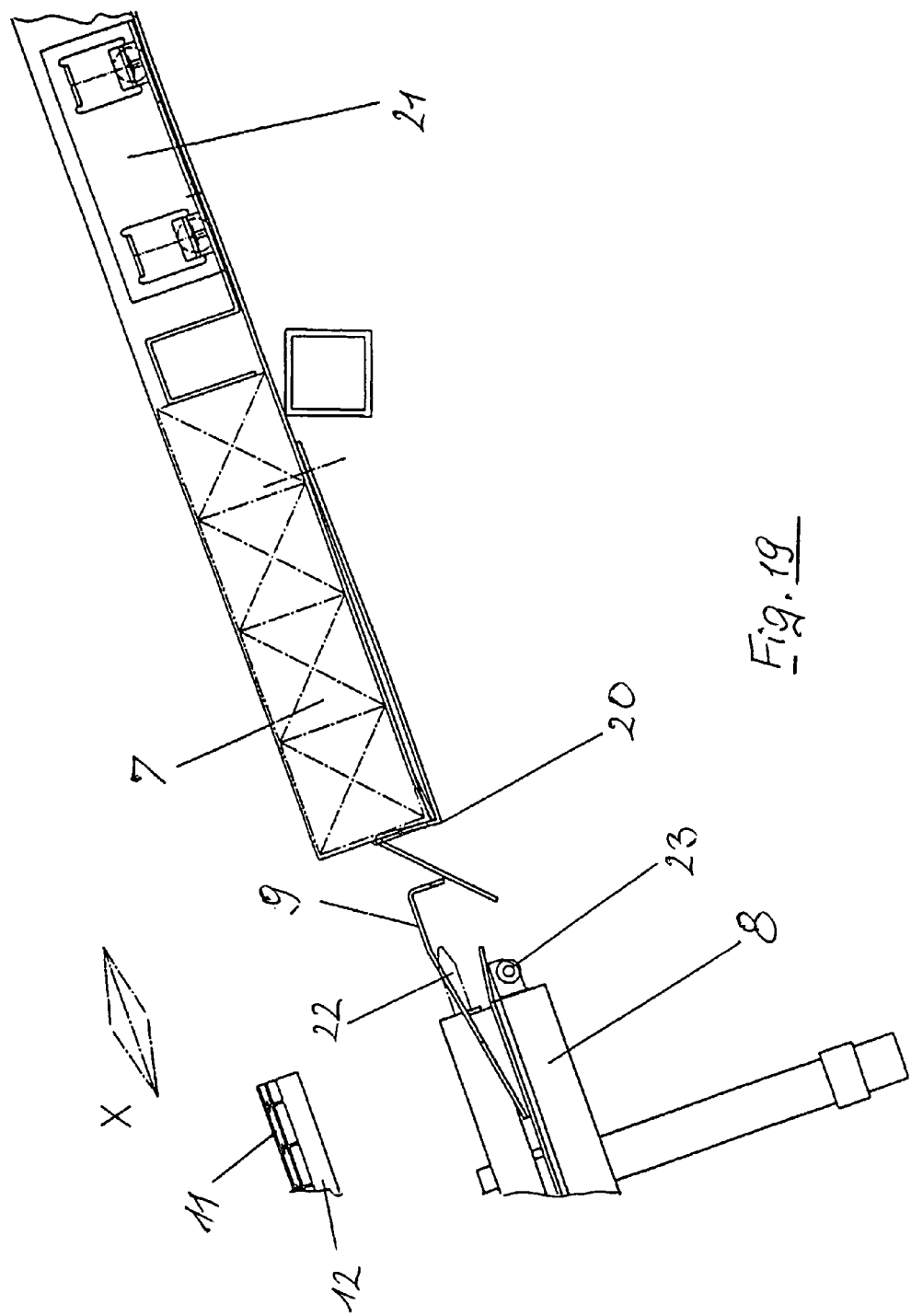
FIG. 19 is a schematic view showing a vertical partial section of the docking operation of the article-handling unit according to FIG. 9 at a higher-level supply bay in a position during the operation.

A stack of articles 7 picked up in the chute may have a longitudinal fixing aid, especially a rolling cart 21 according to FIG. 19, which pushes the stack of articles against the article stop 20.

Like a doubly sloped angle sheet iron, the bottom-side stack-of-articles pick-up 8 of the article-handling unit of the bay-storage and retrieval unit is also sloped, namely, in the starting position during the transportation of a stack of articles from one bay to the next and during the displacement of a stack of articles in the direction of the stack from one bay to the next, but not during positioning and loading in an automatic commissioning unit or during the transfer to the stack-of-articles support 52. The stack of articles is held clamped in the latter position, namely, by the longitudinal clamping plate 12, whose spring-tensioned fingers 11 push the stack of articles picked up in the pick-up 8 against the stack-of-articles pick-up 8.

Each bay-storage and retrieval unit 5 is consequently displaceable by means of the guide or rail system 13 from and to at least one supply bay and can be positioned on the front side at a selected lateral end A of a shaft of the supply bay, namely, at an angle sheet iron 14.

With special reference to FIGS. 19, 20, 21 and 22, a single stack of articles 7 to be handled can reach an aligned article pick-up 8 of the article-handling unit by displacement in the direction S of the stack and vice versa at each elected angle sheet iron.

Instead of a single stack of articles, it is also possible to accommodate two article columns or stacks, located in parallel to one another, in one bay shaft, especially in the case of small articles.

The bay-storage and retrieval unit according to FIGS. 9 through 13 has an article-handling device 51 with an article-handling unit 6, which is fastened on a carriage 25 via a pivot axis 24, wherein the transverse rail 26 is rigidly or telescopically fastened to a vertically displaceable lifting carriage 27 of the bay-storage and retrieval unit 5.

Furthermore, the article-handling device 51 has a stack-of-articles support 52, which has a filling shaft in the form of an angle sheet iron 14, of a vertically adjustable holding-down strap or a guide 55 and of an individual article ejector 53 with cams 60 or knobs or studs, which act as article stops during the actuation of the ejector 53.

The ejector mechanism may be a circulating chain with cams, a toothed belt with cams or even a pneumatic ejector.

The ejector may also have a counter to count the packages filled into the flow shelf (which may also be a roll-through bay with a roller conveyor) and thus to make an inventory in the storage area.

For commissioning large amounts, it is also possible to transfer the stack of articles taken from a higher-level supply directly into a shipping container by means of an ejector.

The filling shaft or the stack-of-articles support 52 can be rotated around a pivot axis 61 and displaced linearly along a telescopic axis 62. In the starting position, the support 52 is in a position in which it cannot collide with the article-handling unit 6, e.g., in the direction of travel of the bay-storage and retrieval unit.

During the operation, the bay-storage and retrieval unit travels, e.g., to the shaft in the higher-level supply bay with the stack of articles to be removed. The feed motion of the article-handling unit 6 via the feed axis or transverse rail 26, which travels in the direction of the imaginary extension of the higher-level supply bay 15, begins thereafter.

Figure 21:
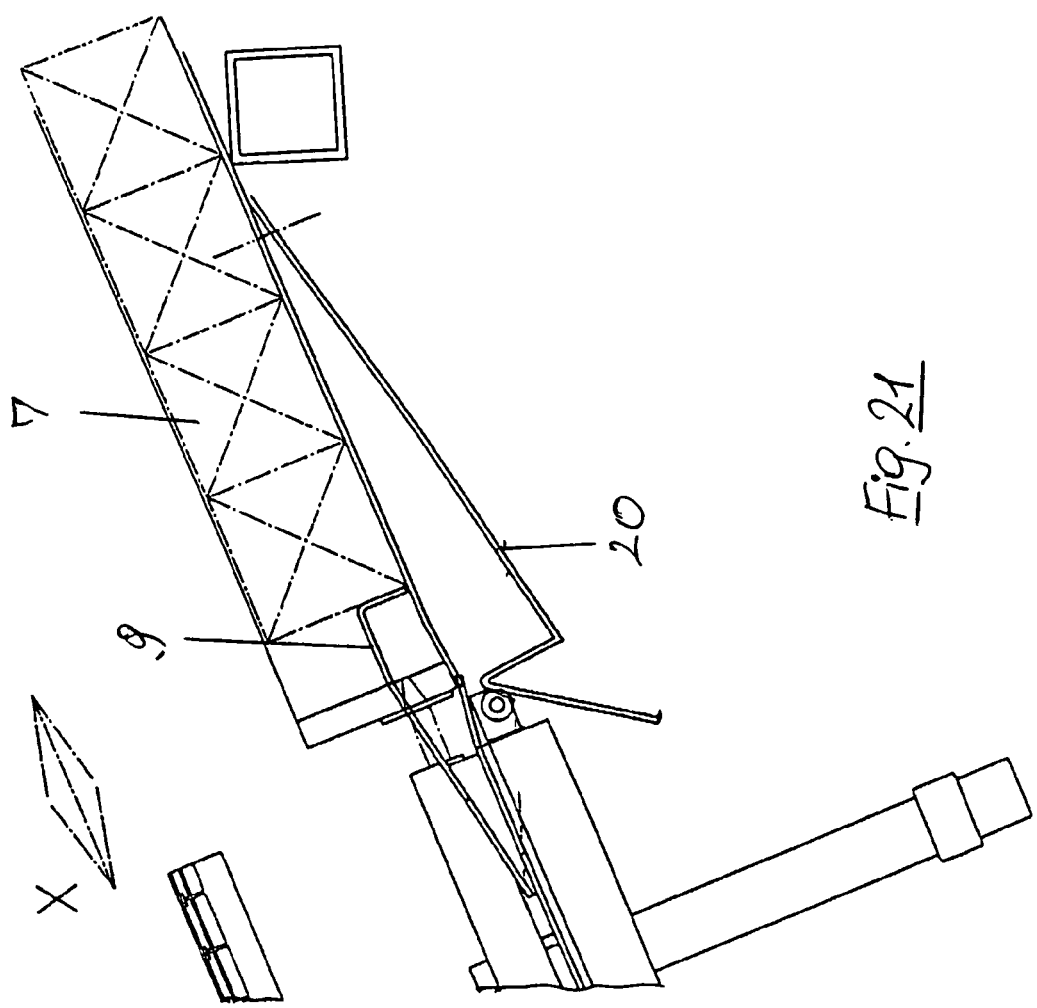
FIG. 21 is a schematic view showing a vertical partial section of the docking operation of the article-handling unit according to FIG. 9 at a higher-level supply bay in another position during the operation.

According to FIGS. 19, 20 and 21, this movement is divided into a plurality of functions:

The stop 20 of the higher-level supply bay is first pressed down by the linear movement via small rollers 23 on the loading unit. At the same time, the stack of articles 7 to be removed is supported in the higher-level supply bay by the pusher 9 of the loading unit. Accurate positioning of the loading unit at the higher-level supply bay by means of a corresponding optical or inductive sensory system or a conical hole centering 22 also takes place during this movement in order to obtain the most homogeneous sliding surface possible between the higher-level supply bay plate and the sliding plate of the loading unit.

The cone 22 also extends either telescopically or via an axis of its own at a higher velocity than does the transverse pusher, so that there will be no collision between components during the loading of the shaft of the automatic commissioning unit.

Figure 22:
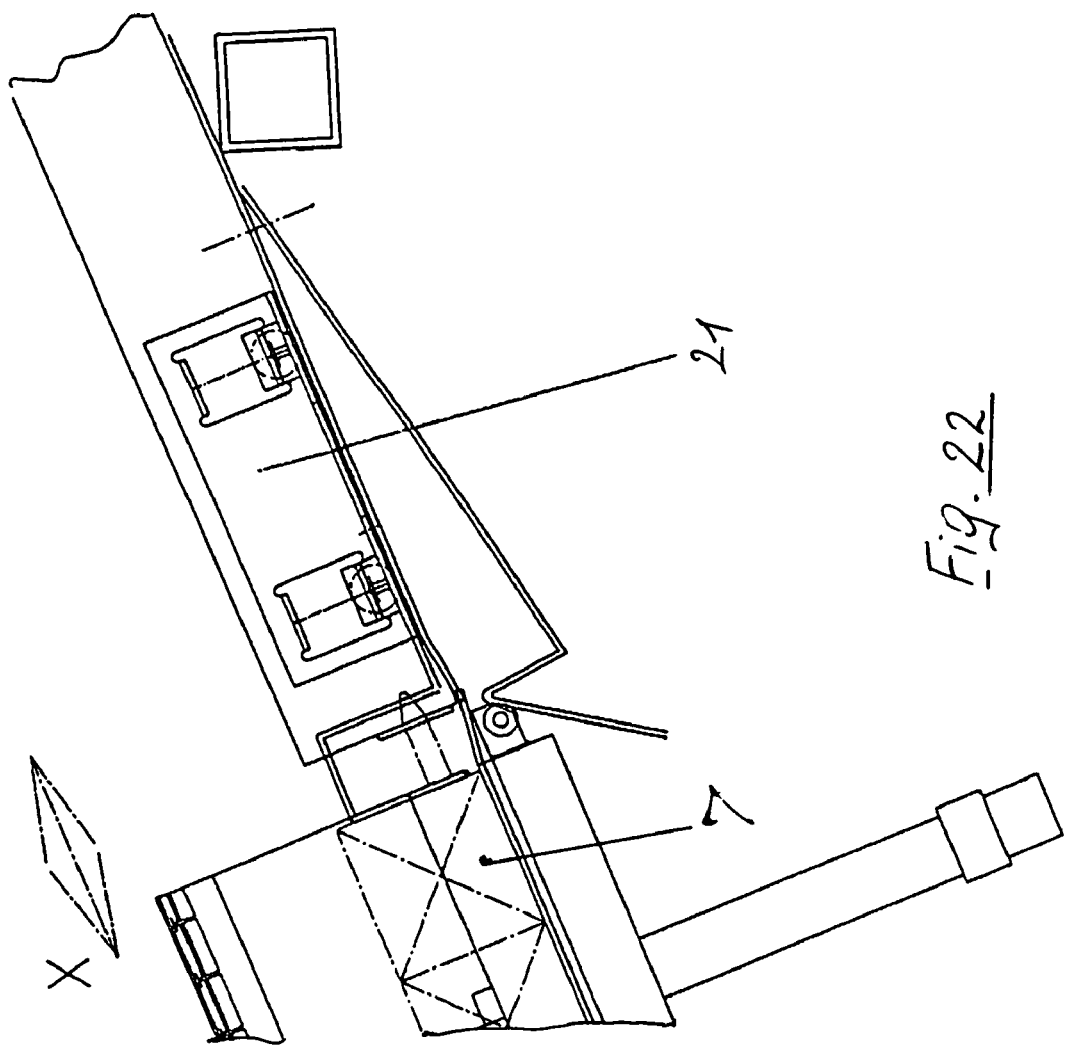
FIG. 22 is a schematic view showing a vertical partial section of the docking operation of the article-handling unit according to FIG. 9 at a higher-level supply bay in another position during the operation.

According to FIG. 22, the removal of the stack of articles 7 is performed after the conclusion of the coupling operation. Due to the displacement of the pusher 9, the stack of articles slides over onto the sliding plate of the loading unit. The support cart 21 now follows the movement continuously at the end of the stack of articles 7 in the higher-level supply bay in order to guarantee the integrity of the stack of articles.

Figure 23:
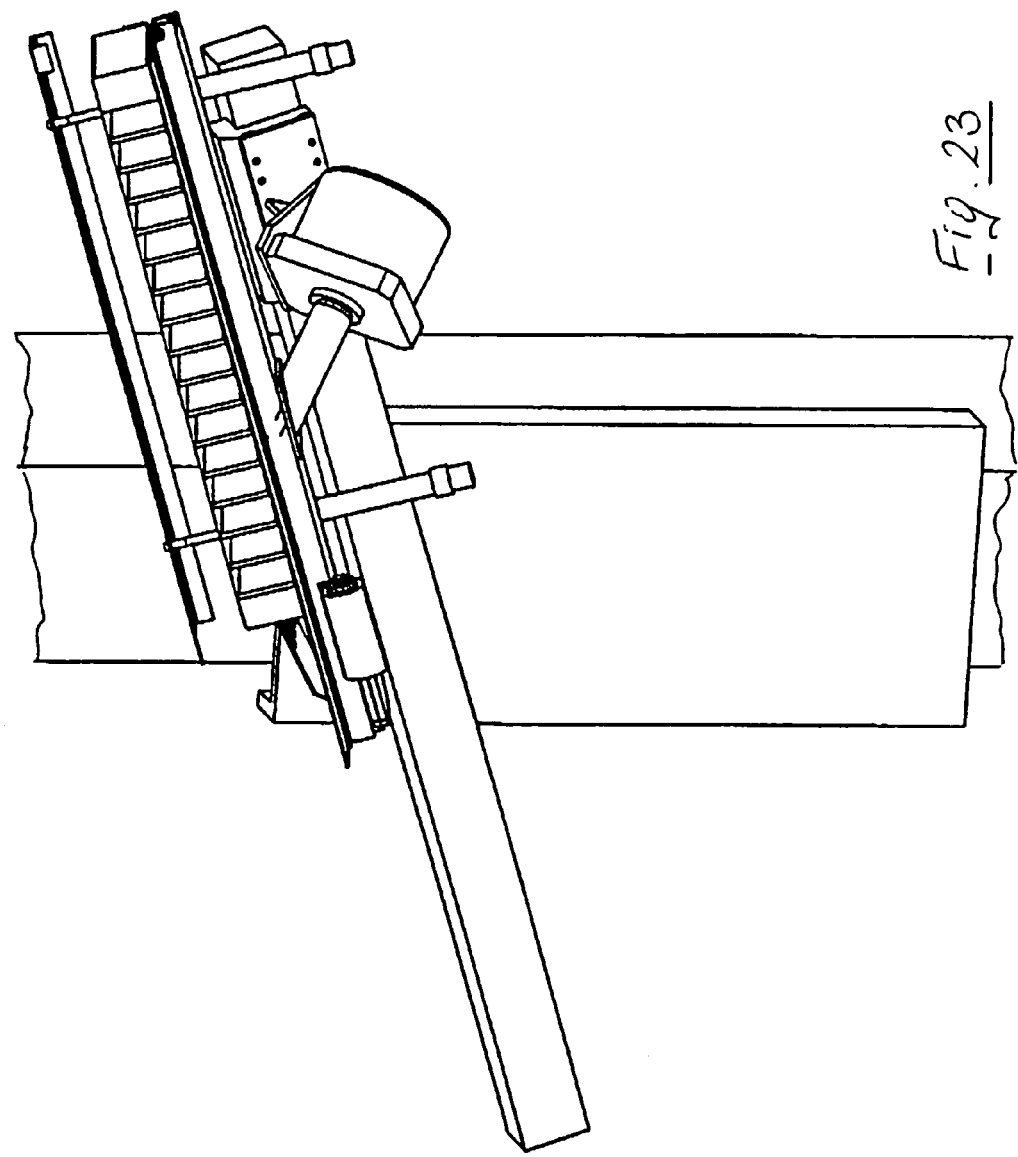
FIG. 23 is a perspective view of the article-handling unit according to FIG. 22 immediately after the picking up of the stack of articles.

According to FIG. 23, this operation is considered to have concluded when the last article of the column or stack has been pushed over onto the loading unit. The support cart 21 continuously exerts its force on the stack up to this position in order to prevent the last article from tilting over or being left behind.

Figure 24:
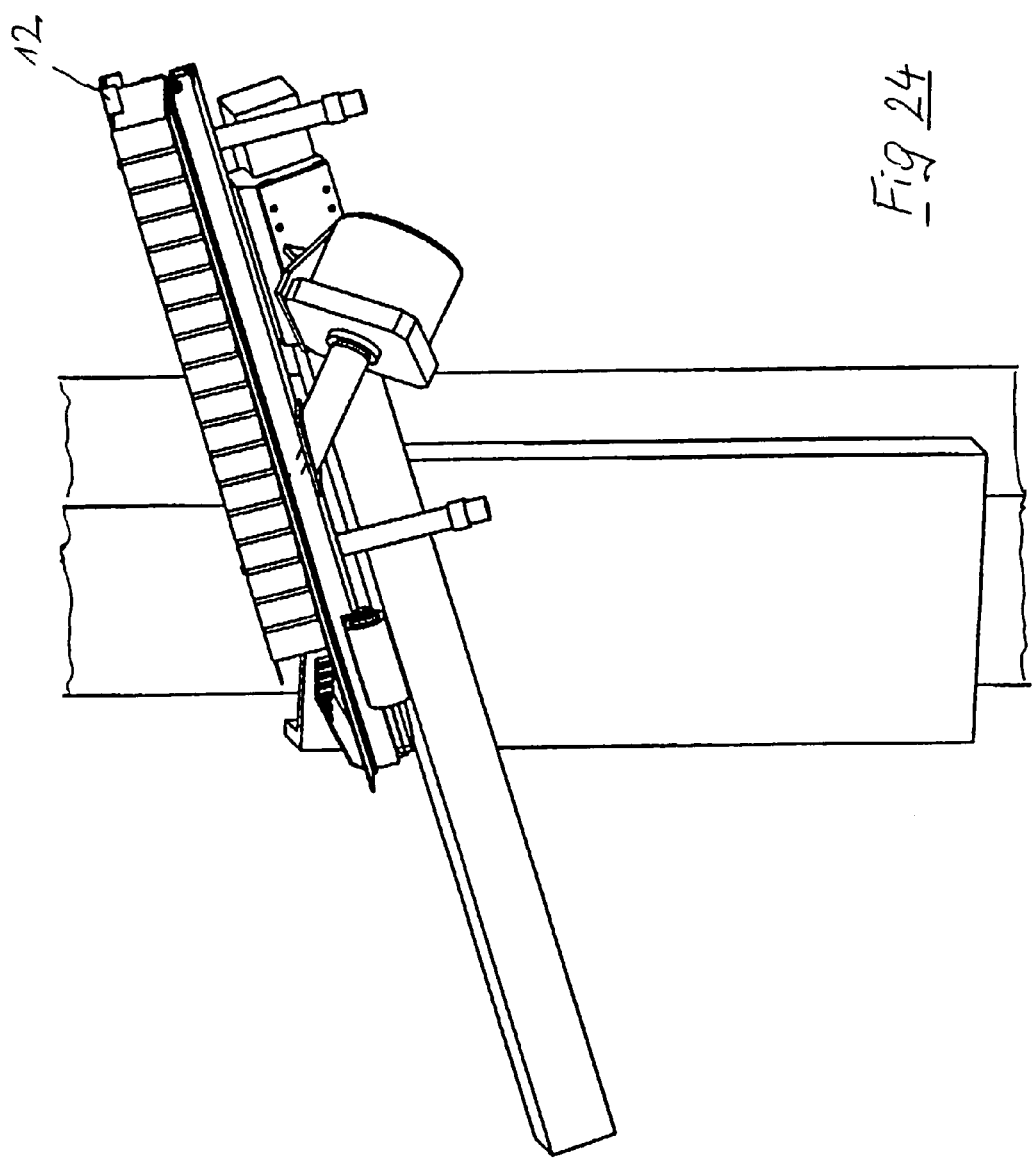
FIG. 24 is a view of the article-handling unit according to FIG. 23 immediately after the clamping of the stack of articles by the transverse displacement of a longitudinal clamping plate, similarly to FIG. 10.

According to FIG. 24, the stack of articles is fixed in its position by means of the clamping device in the form of the longitudinal clamping plate 12 once it is entirely on the loading unit.

Contrary to the coupling situation, upward movement of the stop 20 takes place during the travel of the loading unit due to a sliding movement at the above-described small roller. The support cart continues to travel along in this area with the article column or the stack of articles and is held securely in the higher-level supply bay by the stop that has already swung up after a travel of about 20–30 mm. During the removal of a product column, the rake mounted on the support cart is supported correspondingly at the last product and is held, secured by the stop moving up (dipping of the rake through the stop plate).

The loading unit is then displaced into the middle position by means of the feed axis or transverse rail 26 and the carriage 25. The pivoting with the pivot axis 24 into a position in which the stack of articles 7 stands in parallel to the support 52 takes place here. The article-handling unit with the stack of articles 7 is then pushed to the stack-of-articles support 52 as described by means of the feed axis or transverse rail/carriage 25 such that the front edge of the stack of articles comes into contact with the inner edge of the stack-of-articles support 52. The stack of articles 7 can be placed on the ejector 53 with an optional additional axis.

The additional displaceable axis may be optionally eliminated in order to allow the stack of articles to sit on the push-up device because, as is apparent from FIG. 10, the upper end of the stack of articles 7 is always positioned at exactly the same point of the article-handling unit 6. As a result, deposition is always possible at the same point if the position of the support 52 is known.

The bay-storage and retrieval unit 5 next travels to the article shaft 4 of the automatic commissioning unit to be filled. Accurate positioning in the X and Y directions again takes place here. The stack-of-articles support 52 is then fed to the article shaft 4 by means of the telescopic axis 62.

Since the bay-storage and retrieval unit 5 normally travels in the aisle between the higher-level supply bay 15 and the filling side B of the flow shelf 3, it is possible to commission either manually or automatically at the same time on the other side of the flow shelf.

With reference to FIG. 2, which shows a different arrangement of the higher-level supply bay 15 than does FIG. 1, a collective box from a pallet 41 may be unpacked at the acceptance department E by a person on a work bench and stacks of articles of a length of, e.g., approx. 600 mm can be put together and be arranged on a stacker plate 16, 18.

This "goods acceptance buffer" 16, 18 can be described as follows:

There are about five storage shafts each in two levels and, to make it possible to work ergonomically, one free storage shaft each is pushed into position P. After pushing off, a foot switch is actuated in order to automatically move the next free shaft of the goods acceptance buffer into the correct position. As an alternative, the shafts may also be conveyed on a conveyor belt, in which case one free shaft each is moved into position P. The articles of the same brand are conveyed manually or automatically into the shafts of the goods acceptance buffer.

To these goods acceptance places corresponds a higher-level supply bay 15, which is designed such that an amount of articles received that approximately corresponds to the amount needed in a day is buffered, and the length is selected to be such that a certain number of circulating bay-storage and retrieval units will pass by the goods acceptance places frequently enough to empty and rearrange the shafts filled correspondingly. The removal from the goods acceptance buffer onto the bay-storage and retrieval unit 5 takes place in the same manner as from the higher-level supply bay.

However, other possible embodiments of a stacker plate 18 at the acceptance department E are conceivable as well.

Provisions may be made, in particular, according to FIGS. 15 and 16, to deposit the stacks of articles 7 unpacked from a collective box 17 on a double stacker plate 18, wherein the stack-of-articles stacker plate 18 is rotatable 180° around a vertical axis 19 in order to align the stacks of articles 7 to be removed in the direction of the bay-storage and retrieval unit 5 and also to fill the double stacker plate 18 on the other side.

The bay-storage and retrieval unit 5 according to FIG. 16 can be rotated (after a 180° rotation of the article-handling unit 6) around a vertical axis and adjusted downward in the vertical direction in order to take over the stack of articles 7 by displacement. The longitudinal slope a and the transverse slope b of the stacker plate and of the pick-up 8 are equal. The two devices are exactly aligned with one another in the longitudinal direction, so that a displacement of the stack of articles can take place by utilizing the slope with the support of the rolling cart. The longitudinal pusher 9 is now used to release the article stop at A of the stacker plate, on the one hand, and, on the other hand, "to brake" the stack of articles during the return until the stack of articles has been completely picked up on the pick-up 8 of the article-handling unit of the bay-storage and retrieval unit. The pusher is then used as an article stop.

The article stop A may also be released by the feed motion of the loading unit. The longitudinal pusher itself now has a rake, which can dip through the article stop. This rake moves back the product column by about 20 mm during coupling in order to subsequently pick up the article column utilizing the force of gravity, controlled by the transverse pusher.

Figure 25:
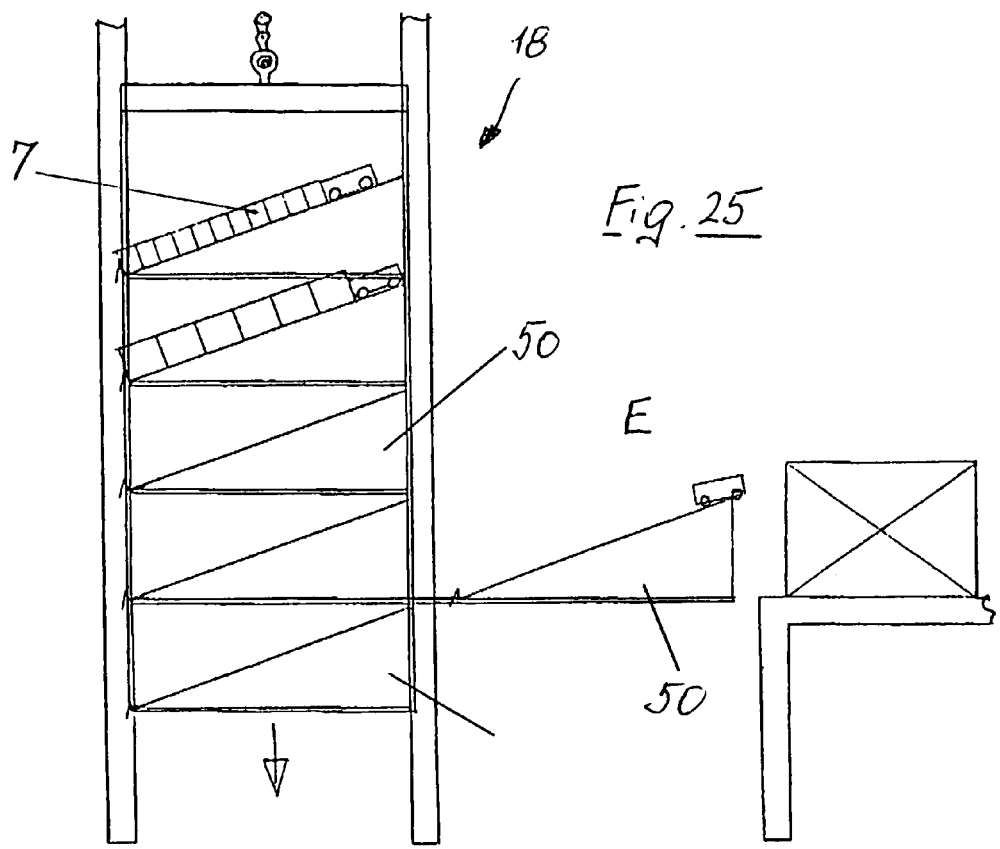
FIG. 25 is a schematic vertical view of an unpacking station with buffer similar to FIG. 16.
Figure 26:
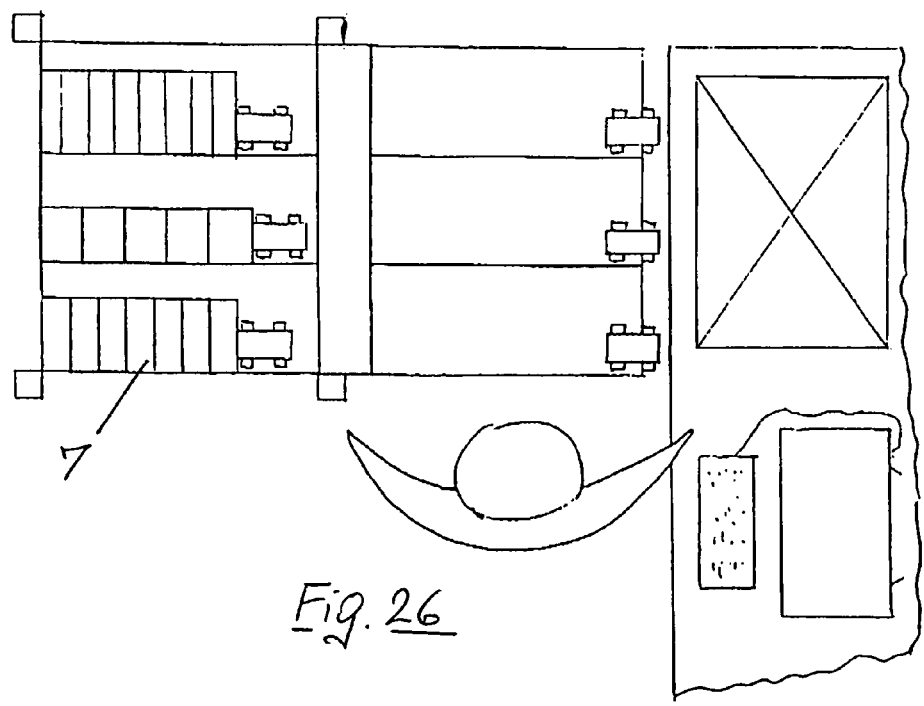
FIG. 26 is a schematic top view of the unpacking station according to FIG. 25 similar to FIG. 17.

Another unpacking station according to FIGS. 25 and 26 can be described as follows:

The stack-of-articles stacker plate 18 comprises a vertically displaceable bay with horizontally movable drawers 50, which can be pulled out manually into the area E of a human operator. The vertically displaceable bay now moves with a free plane to the level of the workplace. The empty drawer 50 is pulled manually to the right according to the drawing, after which, e.g., three shafts in the form of doubly sloped angle sheet irons can be filled with a stack of articles 7 each and each stack of articles can be stabilized with a rolling cart on the top side according to the right-hand part of the drawing. The filled drawer is then returned into the bay. The bay is then adjusted vertically (or laterally) by means of a hand or foot switch such that the next free drawer will reach the working level. The pulling out and pushing in of the drawers as well as the adjustment of the bay in the vertical and/or lateral directions may also be performed automatically on the whole.

For the full automation of the acceptance department, provisions may also be made for mechanically aligning the articles emptied as bulk goods from a collective box, for reading them by a reading station, for being checked by a batch control, for being ordered in columns by a suitable machine and for being delivered into the buffer.

In the variant of a bay-storage and retrieval unit according to the present invention illustrated in FIGS. 3 through 8, the article-handling unit is divided into two parts, namely, a separate, vertically adjustable stack-of-articles pick-up unit 28 with a plurality of angle sheet irons 14 of the type, position and size of the stack-of-articles pick-up 8 and of the supply bay, which has at least one adjustable, second longitudinal stack-of-articles pusher 29 of its own, wherein a plurality of stacks of articles 7 can be conveyed by the stack-of-articles pick-up unit 28 from the buffer 16 or from the stack-of-articles pick-up to the higher-level supply bay 15 as well as loaded and removed, and a separate, vertically adjustable article bay loading unit, which is in turn divided into two parts and has, on the one hand, a vertically adjustable single stack-of-articles pick-up 8' with the longitudinal stack-of-articles pusher 9 and with another, transverse stack-of-articles pusher 31 and, on the other hand, a gripping unit 32 movable in space with the bottom-side stack-of-articles pick-up 8', the longitudinal stack-of-articles clamping plate 12' and the adjustable transverse stack-of-articles pusher 10, wherein a single selected stack of articles 7' (optionally two or more parallel stacks of articles in the case of short articles) can be conveyed by the article bay loading unit from the supply bay (higher-level supply bay 15, buffer 16) or from the stack-of-articles stacker plate 18 of the acceptance department E to the automatic commissioning unit 2 and be loaded piece by piece into a selected, obliquely horizontal shaft of the article bay there.

For loading the stack of articles into the automatic commissioning unit 2, the stack of articles 7 can be removed by the individual stack-of-articles pick-up 8' from the supply bay in the longitudinal direction of the stack by displacement with the longitudinal stack-of-articles pusher 9, and after transfer or transverse displacement V of the stack of articles 7 from the individual stack-of-articles pick-up 8' by the additional transverse stack-of-articles pusher 31 to the bottom-side stack-of-articles pick-up 8' of the aligned gripping unit or stack-of-articles support 52 and after clamping of the entire stack of articles in the transverse direction Q of the stack by the longitudinal clamping plate 12 having spring-tensioned fingers, it can be positioned at the selected shaft of the automatic commissioning unit 2 by moving the gripping unit and it can be loaded article by article.

The gripping unit is fastened via an axis of rotation 33 to a vertically adjustable lifting carriage 34, which is in turn vertically displaceable on a vertical bar 35 of the bay-storage and retrieval unit 5, which said bar is linked on the bottom side around two vertical axes C, D.

The vertical bar 35 has a shorter length than the vertical bar 36 on which the individual stack-of-articles pick-up 8' and the stack-of-articles pick-up unit 28 are vertically displaceable.

According to FIGS. 3 through 8, the combined goods storage and loading device can consequently remove article columns 7 from the acceptance department by means of the goods acceptance unit from obliquely positioned bays sloping toward the device. The stack is guided by the positioned pusher. This pusher also introduces the goods into the bay at the loading site. The pusher is displaceable over a plurality of stacks of articles and product cartons on the goods loading unit. The goods loading unit and the loading unit are vertically displaceable on the axis 36 up to a height of about 5.5 m. The device itself is rail-borne, is able to travel in curves and is guided directly at the bay rows and can travel, especially by means of controlled switches, in short circuits and short circles, such that the entire warehouse area can be covered. The entire unit can be expanded by increasing the number of bay-storage and retrieval units.

The loading unit comprises essentially two components: The removing unit from the bay by means of pushers and the loading unit with a pivotable axis 35. The height to be loaded is approx. 2 m to 2.5 m in the case of automatic commissioning units, i.e., the loading device does not necessarily have to travel up to the bottom of the highest bay to take over the goods. This is performed by the removing unit and by pushing off the goods removed into the gripper or the support 52.

The storage removal unit performs positioning at the corresponding bay shaft, releases a brake and takes over the stack 7 onto the oblique plane by moving back the pusher 9. This unit then moves into the area of the loading unit, which is positioned before the stack of articles. This stack of articles is pushed with the pusher 31 into the gripper, and the rear stop is established by the displaceable plate or the transverse pusher 10. It is achieved due to this stop that the front edge of the article is always at the same point during loading.

Even though doubly sloped angle sheet irons are particularly advantageous as the support and stacker plate for stacks, it is obvious that a simple slope of angle sheet irons or a horizontal arrangement is also possible if corresponding drives and fixing aids are provided for the stack of articles.

While specific embodiments of the invention have been shown and described in detail to illustrate the application of the principles of the invention, it will be understood that the invention may be embodied otherwise without departing from such principles.

What is claimed is:

1. A commissioning system for a plurality of articles, the system comprising:

a plurality of article shafts arranged next to one another and one on top of another, each of said plurality of article shafts being sloped with respect to horizontal to have an upper and lower end, said each of said plurality of article shafts having a support for holding a plurality of the articles;

a cart horizontally movable along said plurality of article shafts;

an article loader mounted vertically movably on said cart, said loader having a support for holding a stack of the articles, the stack of articles having a longitudinal axis, vertical movements of said article loader on said cart and horizontal movements of said cart selectively arrange said article loader at each of said plurality of article shafts, said article loader including an ejector movable in a transverse direction to said longitudinal axis of the stack of articles and individually ejecting one of the articles from the stack of articles in said transverse direction into a selected one of said article shafts.

2. A system in accordance with claim 1, wherein:

said ejector is arranged at a bottom of said article loader and moves a lowermost article of the stack of articles from said article loader into said upper end of said selected one of said article shafts;

wherein the articles slide from said upper end to said lower end of each said shaft by gravity.

3. A system in accordance with claim 1, wherein:

said ejector is arranged at a top of said article loader and moves an uppermost article of the stack of articles from said article loader into said upper end of said selected one of said article shafts;

a lifter is arranged in said article loader to lift the stack of articles to said ejector.

4. A system in accordance with claim 1, wherein:

said plurality of article shafts are arranged in a first bay;

another plurality of article shafts are arranged in a second bay;

said cart is movable between said first and second bays;

said article loader receives the stack of articles from one of said another plurality of shafts in said second bay;

said article loader includes a clamp for clamping the stack of articles.

5. A system in accordance with claim 4, wherein:

said clamp selectively clamps and unclamps the stack of articles.

6. A system in accordance with claim 4, wherein:

said clamp selectively clamps the stack of articles after receiving the articles from the second bay, while moving the articles from said first bay to said second bay, and before ejecting the articles into said first bay;

said clamp selectively unclamps while receiving the articles from the second and while ejecting the articles into said first bay.

7. A commissioning system for a plurality of articles, the system comprising:

first and second bays, each of said bays including a plurality of article shafts arranged next to one another and one on top of another, each of said plurality of article shafts being sloped with respect to horizontal to have an upper and lower end, each of said plurality of article shafts having a stopper for holding the articles in a sloped position in said article shafts, said first and second bays being spaced from each other;

a cart horizontally movable along said plurality of article shafts and between said first and second bays;

an article loader mounted vertically movably, pivotally movable and transversely movable on said cart to be selectively positioned and aligned with one of said article shafts of said first bay, said loader having a support for receiving a stack of the articles from said one article shaft, said support holding the stack of articles while said article loader moves vertically, pivotally and transversely to position the stack of articles at another of said article shafts in said second bay, the stack of articles having a longitudinal axis, said article loader including an ejector movable in a transverse direction to said longitudinal axis of the stack of articles and individually ejecting one of the articles from the stack of articles in said transverse direction into said another of said article shafts in said second bay.

8. A system in accordance with claim 7, wherein:

said ejector is arranged at a bottom of said article loader and moves a lowermost article of the stack of articles from said article loader into said upper end of said selected one of said article shafts;

wherein the articles slide from said upper end to said lower end of each said shaft by gravity.

9. A system in accordance with claim 7, wherein:

said ejector is arranged at a top of said article loader and moves an uppermost article of the stack of articles from said article loader into said upper end of said selected one of said article shafts;

a lifter is arranged in said article loader to lift the stack of articles to said ejector.

10. A system in accordance with claim 7, wherein:

said article loader includes a clamp for clamping the stack of articles.

11. A system in accordance with claim 10, wherein:

said clamp selectively clamps and unclamps the stack of articles.

12. A system in accordance with claim 10, wherein:

said clamp selectively clamps the stack of articles after receiving the articles from the second bay, while moving the articles from said first bay to said second bay, and before ejecting the articles into said first bay;

said clamp selectively unclamps while receiving the articles from the second and while ejecting the articles into said first bay.

* * * * *